US009883207B2

(12) United States Patent
Misra et al.

(10) Patent No.: US 9,883,207 B2
(45) Date of Patent: Jan. 30, 2018

(54) METHODS AND APPARATUS FOR ADAPTIVE COUPLED PRE-PROCESSING AND POST-PROCESSING FILTERS FOR VIDEO ENCODING AND DECODING

(75) Inventors: Kiran Misra, Vancouver, WA (US); Joel Sole, La Jolla, CA (US); Peng Yin, Ithaca, NY (US); Xiaoan Lu, Princeton, NJ (US); Yunfei Zheng, San Diego, CA (US); Qian Xu, Folsom, CA (US)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 553 days.

(21) Appl. No.: 13/518,942

(22) PCT Filed: Dec. 2, 2010

(86) PCT No.: PCT/US2010/003081
§ 371 (c)(1),
(2), (4) Date: Jun. 25, 2012

(87) PCT Pub. No.: WO2011/081637
PCT Pub. Date: Jul. 7, 2011

(65) Prior Publication Data
US 2012/0281753 A1 Nov. 8, 2012

Related U.S. Application Data

(60) Provisional application No. 61/291,596, filed on Dec. 31, 2009.

(51) Int. Cl.
*H04N 7/26* (2006.01)
*H04N 7/30* (2006.01)
(Continued)

(52) U.S. Cl.
CPC ........... *H04N 19/86* (2014.11); *H04N 19/102* (2014.11); *H04N 19/107* (2014.11);
(Continued)

(58) Field of Classification Search
None
See application file for complete search history.

(56) References Cited

U.S. PATENT DOCUMENTS

| 5,311,310 A | 5/1994 | Jozawa et al. |
| 6,084,908 A * | 7/2000 | Chiang .................... G06T 7/20 |
| | | 348/E5.066 |

(Continued)

FOREIGN PATENT DOCUMENTS

| CN | 1805548 | 7/2006 |
| EP | 1684521 | 7/2006 |

(Continued)

OTHER PUBLICATIONS

Vatis, et al.I, "Adaptive Interpolation Filter for H.264/AVC", IEEE Transactions on Circuits and Systems for Video Technology, vol. 19, No. 2, Feb. 1, 2009.

(Continued)

*Primary Examiner* — Andy Rao
*Assistant Examiner* — Samuel D Fereja
(74) *Attorney, Agent, or Firm* — Brian J. Dorini; Ronald J. Kolczynski

(57) ABSTRACT

Methods and apparatus are provided for adaptive coupled pre-processing and post-processing filters for video encoding and decoding. The apparatus and method encode input data for a picture into a resultant bitstream, wherein said video encoder comprises a pre-filter and a post-filter coupled to the pre-filter, wherein said pre-filter filters the input data for the picture and the post-filter filters in-loop reconstructed data for the picture.

28 Claims, 19 Drawing Sheets

(51) Int. Cl.
*H04N 19/86* (2014.01)
*H04N 19/102* (2014.01)
*H04N 19/107* (2014.01)
*H04N 19/117* (2014.01)
*H04N 19/186* (2014.01)
*H04N 19/44* (2014.01)
*H04N 19/82* (2014.01)
*H04N 19/42* (2014.01)
*H04N 19/85* (2014.01)

(52) U.S. Cl.
CPC ......... *H04N 19/117* (2014.11); *H04N 19/186* (2014.11); *H04N 19/42* (2014.11); *H04N 19/44* (2014.11); *H04N 19/82* (2014.11); *H04N 19/85* (2014.11)

(56) References Cited

U.S. PATENT DOCUMENTS

| | | | |
|---|---|---|---|
| 9,124,874 B2* | 9/2015 | Chen | H04N 13/0059 |
| 2004/0131121 A1* | 7/2004 | Dumitras | H04N 19/00 375/240.16 |
| 2006/0133684 A1* | 6/2006 | Srinivasan et al. | 382/250 |
| 2006/0268990 A1* | 11/2006 | Lin | H04N 19/176 375/240.24 |
| 2006/0288065 A1* | 12/2006 | Lelescu | 708/300 |
| 2007/0071095 A1* | 3/2007 | Lim | H04N 19/86 375/240.08 |
| 2007/0127579 A1* | 6/2007 | Dumitras | H04N 19/00 375/240.27 |
| 2007/0172211 A1 | 7/2007 | Panda et al. | |
| 2008/0165036 A1* | 7/2008 | Shima | H03M 7/40 341/51 |
| 2008/0317368 A1* | 12/2008 | Tu et al. | 382/248 |
| 2009/0060368 A1* | 3/2009 | Drezner et al. | 382/261 |
| 2009/0148062 A1* | 6/2009 | Gabso et al. | 382/266 |
| 2009/0175359 A1* | 7/2009 | Jeon | H04N 19/00018 375/240.29 |
| 2009/0257501 A1* | 10/2009 | Ye | H04N 19/46 375/240.16 |
| 2010/0104027 A1* | 4/2010 | Youn | H04N 19/00066 375/240.29 |
| 2010/0150463 A1* | 6/2010 | Yeung | H04N 19/147 382/239 |
| 2010/0220931 A1* | 9/2010 | Zhou | 382/199 |
| 2010/0284461 A1* | 11/2010 | Andersson et al. | 375/240.12 |
| 2010/0309983 A1* | 12/2010 | Jax | 375/240.18 |
| 2011/0090960 A1* | 4/2011 | Leontaris | H04N 19/103 375/240.12 |
| 2011/0170591 A1* | 7/2011 | Li | H04N 19/105 375/240.01 |
| 2013/0003872 A1* | 1/2013 | Alvarez et al. | 375/240.29 |
| 2013/0188689 A1* | 7/2013 | Garbacea | H04N 19/176 375/240.03 |

FOREIGN PATENT DOCUMENTS

| | | |
|---|---|---|
| JP | 6217290 | 8/1994 |
| KR | 20060129096 | 12/2006 |
| WO | WO2006138654 | 12/2006 |
| WO | WO2007021615 | 2/2007 |

OTHER PUBLICATIONS

Tran et al., "Lapped Transform Based Video Coding", Proceedings of SPIE, vol. 4472, Aug. 1, 2001, pp. 319-333.

Tran et al., "Lapped Transform via Time-Domain Pre- and Post-Filtering", IEEE Transactions on Signal Processing, vol. 51, No. 6, Jun. 1, 2003, pp. 1557-1571.

ITU-T H.264 Standard, "Advanced Video Coding for Generic Audiovisual Services", International Telecommunication Union, Mar. 2005, 343 pages.

Malvar, "Biorthogonal and Nonuniform Lapped Transforms for Transform coding with Reduced Blocking and Ringing Artifacts", IEEE Transactions on Signal Processing, vol. 46, No. 4, Apr. 1998, pp. 1-11.

Lelescu, "Nonlinearly-Adapted Lapped Transforms for Intra-Frame Coding", ICME 2006, four pages.

Search report dated Mar. 2, 2011.

* cited by examiner

… (1)

METHODS AND APPARATUS FOR ADAPTIVE COUPLED PRE-PROCESSING AND POST-PROCESSING FILTERS FOR VIDEO ENCODING AND DECODING

CROSS-REFERENCE TO RELATED APPLICATIONS

This application is a National Stage Application and claims the benefit, under 35 U.S.C. §365 of International Application PCT/US2010/003081 filed Dec. 2, 2010 which was published in accordance with PCT Article 21(2) on Jul. 7, 2011 in English, and which claims the benefit of U.S. Provisional Patent Application No. 61/291,596 filed on Dec. 31, 2009.

TECHNICAL FIELD

The present principles relate generally to video encoding and decoding and, more particularly, to methods and apparatus for adaptive coupled pre-processing and post-processing filters for video encoding and decoding.

BACKGROUND

A block-based transform approach has been the primary choice for transforms in current video compression schemes and standards, such as the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), when compared with more advanced transform approaches (such as sub-band coding, for example) due to its inherently lower complexity and achievement of comparable performance. Lapped transforms perform significantly better than non-overlapping transforms such as discrete cosine transforms (DCTs) while incurring just a small increase in complexity. Lapped transforms can be designed to maximize coding gain, maximize energy compaction, provide good frequency response, maximize regularity in the basis, or maximize a combination of the above objectives. The coding gain is especially of interest since it translates directly to an improvement in the rate-distortion performance. The coding gain of a transform is computed as the ratio of the "reconstruction distortion without transform" to that of the "reconstruction distortion with transform". Under the high-bitrate assumption, this quantity for a lapped bi-orthogonal transform (LBT) is described in a first prior art approach as follows:

$$G_{TC} = \left\{ \prod_{i=1}^{M} \left[ \left( \frac{\sigma_{y_i}^2}{\sigma_x^2} \right) \|P_i^{-1}\|^2 \right] \right\}^{-\frac{1}{M}} \quad (1)$$

where $\sigma_x^2$ is the variance of source x, y is the output of the lapped transform, $\sigma_{y_i}^2$ is the variance of the $i^{th}$ transform output, and $P_i^{-1}$ is the $i^{th}$ synthesis basis (post-filter column) of the lapped transform. The design of a high bitrate lapped transform requires that the coding gain defined in Equation (1) is maximized.

In a second prior art approach, an alternate equivalent is disclosed for decomposing the quasi-optimal lapped transform into a pre-filter operation followed by a shifted DCT operation. The advantage is that the pre-filter approach can be applied outside of existing encoder and decoder loops, therefore the second prior art approach requires little change within existing encoders and decoders.

For the pre-filtering based approach to lapped transform, the output y can be represented as follows:

$$y = DCT[\text{Shift}(Px)] \quad (2)$$

where Shift is a time-shift between the pre-filter and the block transform, and P is the pre-filter applied on current data x.

Turning to FIG. 1, an implementation of a 4×8 lapped transform as a 4×4 pre-filter followed by a shifted 4×4 DCT operation is indicated generally by the reference numeral 100 That is, FIG. 1 depicts two equivalent implementations of the lapped transform. In the top portion of FIG. 1, 8 input samples are directly transformed into 4 output samples by the lapped bi-orthogonal transform. Note that in order to have the same number of total input and output samples, the next 8 input samples are taken with an overlap with the first 8 input samples, as can be observed in FIG. 1. Regarding the bottom portion of FIG. 1, where the implementation uses a pre-filter, the following is involved: first a pre-filter is applied to 4 input samples; and then a DCT is applied. Note that the shift between the pre-filter and the discrete cosine transform allows for the processing of 8 input samples for each 4 output samples in exactly the same way as the top portion of FIG. 1.

Previous efforts to augment the block-based coding approach such as that performed in the MPEG-4 AVC Standard include using pre-processing filters and post-processing filters and increasing the coding gain while ignoring the impact on predictive-coding efficiency. However, such prior art pre-filters are designed to work with only a single transform. For example, a third prior art approach involves a scheme in which the 4×4 pre-filter was designed to work with the 4×4 DCT for intra-coding only. Additionally, the third prior art approach does not give any consideration to modifying dependent encoder and decoder blocks such as the rate-distortion optimizer and the most probable mode predictor to work in unison with pre-filtering and post-filtering and achieve a higher compression efficiency.

SUMMARY

These and other drawbacks and disadvantages of the prior art are addressed by the present principles, which are directed to methods and apparatus for adaptive coupled pre-processing and post-processing filters for video encoding and decoding.

According to an aspect of the present principles, there is provided an apparatus. The apparatus includes a video encoder for encoding input data for a picture into a resultant bitstream. The video encoder includes a pre-filter and a post-filter coupled to the pre-filter. The pre-filter filters the input data for the picture and the post-filter filters in-loop reconstructed data for the picture.

According to another aspect of the present principles, there is provided a method in a video encoder. The method includes encoding input data for a picture into a resultant bitstream. The video encoder includes a pre-filter and a post-filter coupled to the pre-filter. The pre-filter filters the input data for the picture and the post-filter filters in-loop reconstructed data for the picture.

According to still another aspect of the present principles, there is provided an apparatus. The apparatus includes a video decoder for decoding residual image data for a picture.

The video decoder includes a pre-filter and a post-filter coupled to the pre-filter. The pre-filter filters a reference picture for use in decoding the residual image data and the post-filter filters in-loop reconstructed data for the picture.

According to yet another aspect of the present principles, there is provided a method in a video encoder. The method includes decoding residual image data for a picture. The video decoder includes a pre-filter and a post-filter coupled to the pre-filter. The pre-filter filters a reference picture for use in decoding the residual image data and the post-filter filters in-loop reconstructed data for the picture.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
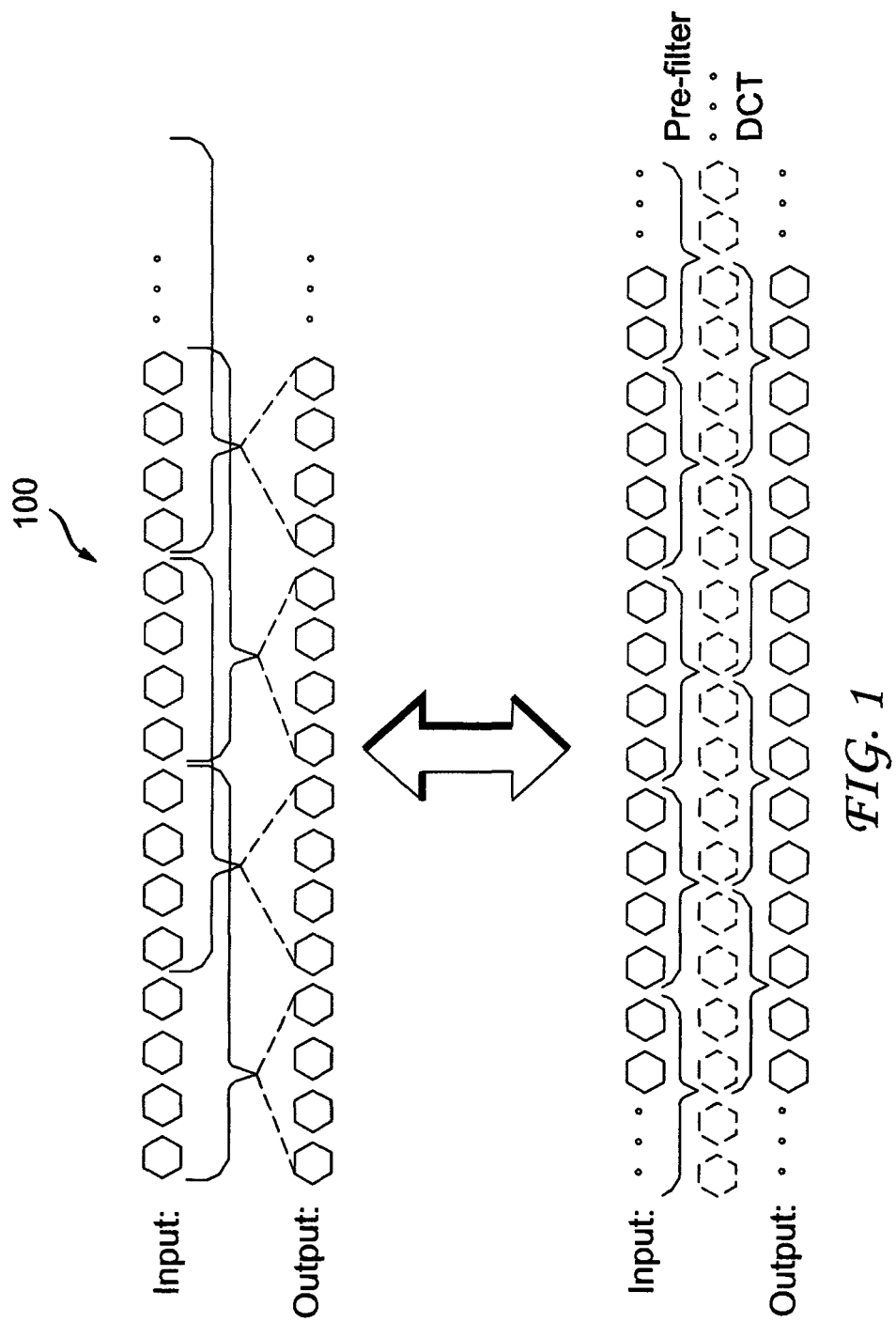
FIG. 1 is a diagram showing a direct implementation of a 4×8 lapped transform and the equivalent implementation as a 4×4 pre-filter followed by a shifted 4×4 DCT operation.

The present principles are directed to methods and apparatus for adaptive coupled pre-processing and post-processing filters for video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the terms "pre-filter" and "pre-processing filter" are used interchangeably. Similarly, the terms "post-filter" and "post-processing filter" are used interchangeably herein. It is to be appreciated that the present principles are applicable at the encoder and decoder.

Moreover, as used herein, the phrase "exact inverse", when used to describe a relationship between the pre-filter and the post-filter, refer to filter coefficients and filter parameters for the pre-filter and the post-filter being selected such that a filtering result obtained from the post-filter is an inverse of the filtering result obtained from the pre-filter. In other words, "exact inverse" describes the relationship between the pre-filter and post-filter such that, in the absence of any other processing (such as, e.g., quantization), the input of the pre-filter, processed by the pre-filter and then by the post-filter, is the same as the output of the post-filter.

Further, as used herein, the phrase "substantial inverse", when used to describe a relationship between the pre-filter and the post-filter, refer to filter coefficients and filter parameters for the pre-filter and the post-filter being selected such that a filtering result obtained from the post-filter is substantially an inverse of the filtering result obtained from the pre-filter. Similarly, when the phrase "substantial inverse" is used to describe a relationship between the pre-filter and the post-filter when the post-filter is adaptive, refers to an adaptation parameter for the post-filter being selected so that "small" perturbations do not significantly impact the adaptation. This definition is related to the mathematical concept of stability. That is, given a small variation of the input, then the output variation is also small. For example, it can be expressed mathematically by stating that the norm of the difference of the output is smaller than the norm of the difference of the input times some constant. A typical example of this fact is a linear system, since variations of the input (for example, quantizing the data), implies variations of the output of the same order. The same idea is meant by "substantial inverse", which does not guarantee the "exact inverse", but it is substantially close, where "substantially" can be expressed, for example, as the constant that relates the norms of the input and output difference, for any input acceptable in the system.

For purposes of illustration and description, examples are described herein in the context of improvements over the MPEG-4 AVC Standard, using the MPEG-4 AVC Standard as the baseline for our description and explaining the improvements and extensions beyond the MPEG-4 AVC Standard. However, it is to be appreciated that the present principles are not limited solely to the MPEG-4 AVC Standard and/or extensions thereof. Given the teachings of the present principles provided herein, one of ordinary skill in this and related arts would readily understand that the present principles are equally applicable and would provide at least similar benefits when applied to extensions of other standards, or when applied and/or incorporated within standards not yet developed. It is to be further appreciated that the present principles also apply to video encoders and video decoders that do not conform to standards, but rather confirm to proprietary definitions.

As noted above, the block-based coding approach used in the MPEG-4 AVC Standard does not effectively exploit the correlation existing at inter-transform block boundaries. To be clear, as used herein, "inter-transform block" refers to a block of data processed by different transforms. Spatial correlation within a block is removed by the transform, that is, intra-transform data is de-correlated by the transform. However, since transforms in MPEG-4 AVC do not overlap, the correlation between data belonging to different transform blocks is not removed properly. In accordance with the present principles, we disclose methods and apparatus that define a coupled set of adaptive pre-processing filters and post-processing filters which exploit inter-transform block correlation and reduce blocking artifacts observed in video coding. For example, the coupled set of filters may include one or more pre-processing filters coupled to one or more post-processing filters.

In an embodiment, the filter adaptation may be based on, for example, the "gradient" calculated for the input data and/or the "quantizer step size" and/or local data statistics such as "variance". At least one embodiment is disclosed relating to designing and optimizing the pre-processing filters and post-processing filters to "work in concert with the prediction (either spatial or temporal) mechanism". This joint design and optimization helps achieve better overall rate-distortion performance. Further, the pre-processing filters and post-processing filters help in the preservation of edges, leading to better perceptual quality. The present principles also outline how to modify the existing video architecture, such as the rate-distortion optimizer and the most probable mode predictor, in order to achieve better performance gains.

The goal of the pre-processing filters and post-processing filters is to exploit this inter-transform block correlation and therefore achieve higher coding efficiency. Additionally, since the pre-processing filters and post-processing filters are applied across transform block boundaries, they help reduce blocking artifacts often seen in block-based video coding.

The pre-filter is typically applied to the original frame before the redundancy is removed using prediction. If a strong pre-filter is applied to the original frame, it would severely perturb the very pixels used for prediction. The poor quality of the prediction would consequently reduce the compression efficiency of predictive-coding. Consequently, the overall encoder and decoder compression efficiency would also be reduced. To consider and compensate for the impact of pre-filtering on predictive-coding, we disclose a new pre-filter design methodology. In an embodiment, the pre-filter is adapted to the "gradient" calculated for the input data and/or the "quantizer step size" and/or local data statistics such as "variance" for better compression efficiency. A coupled "adaptive" post-filter is designed to reverse the operations carried out by the pre-filter at the encoder. The performance of the system is further improved by modifying the rate-distortion optimizer and the most probable mode predictor, to work in conjunction with the pre-processing filters and post-processing filters.

Figure 2:
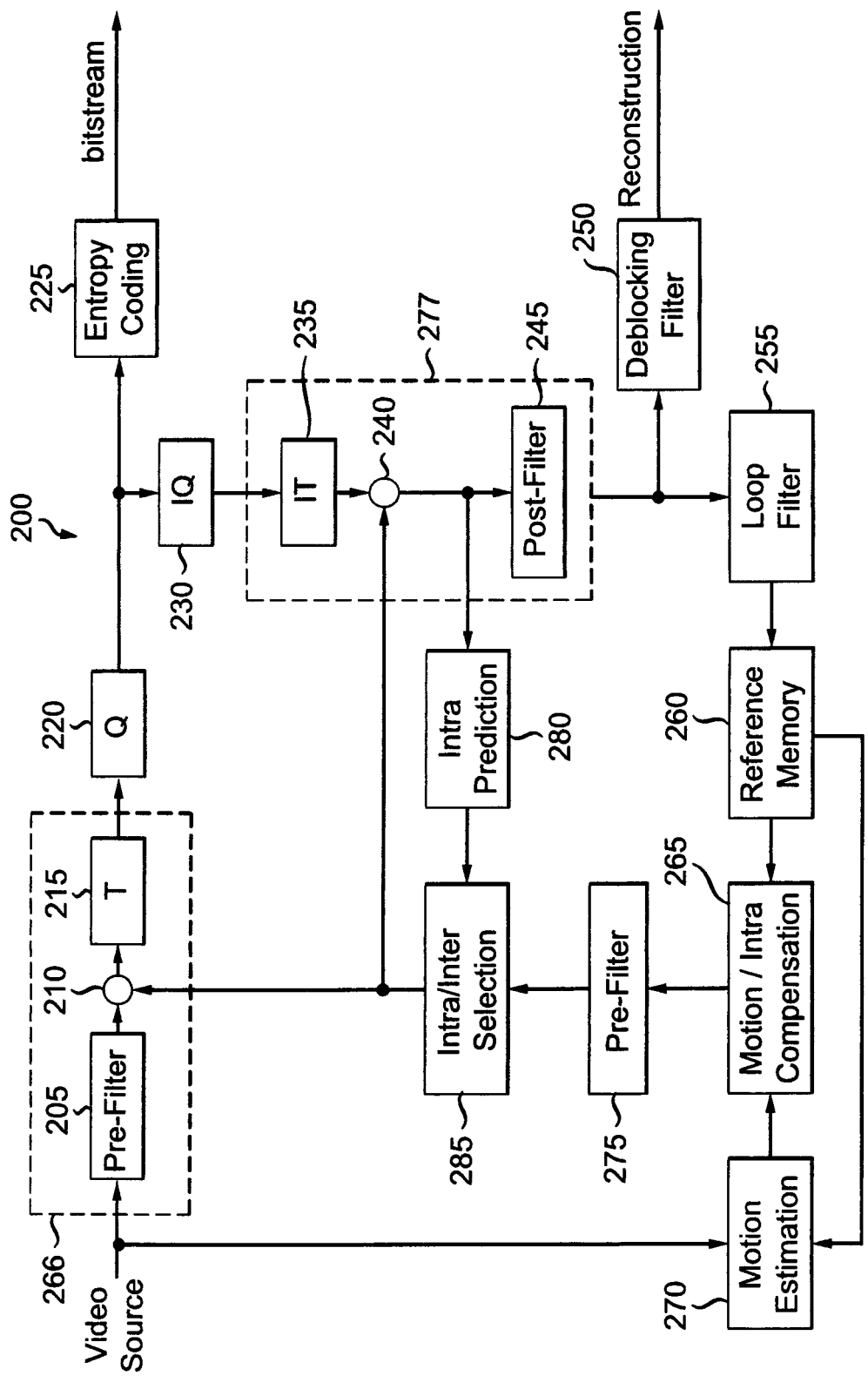
FIG. 2 is a block diagram showing an exemplary video encoder with pre-processing filters and post-processing filters, in accordance with an embodiment of the present principles.

Turning to FIG. 2, an exemplary video encoder with pre-processing filters and post-processing filters is indicated generally by the reference numeral 200. The video encoder 200 includes a pre-filter 205 having a first output connected in signal communication with a first input of a combiner 210. An output of the combiner is connected in signal communication with an input of a transformer (T) 215. An output of the transformer (T) 215 is connected in signal communication with an input of a quantizer (Q) 220. An output of the quantizer (Q) 220 is connected in signal communication with an input of an entropy coder 225 and an input of an inverse quantizer (IQ) 230. An output of the inverse quantizer (IQ) 230 is connected in signal communication with an input of an inverse transformer (IT) 235. An output of the inverse transformer (IT) 235 is connected in signal communication with a first non-inverting input of a combiner 240. An output of the combiner 240 is connected in signal communication with a first input of a post-filter 245 and an input of an intra predictor 280. An output of the post-filter 245 is connected in signal communication with an input of a deblocking filter 250 and an input of a loop filter 255. An output of the loop filter 255 is connected in signal communication with an input of a reference memory 260. A first output of the reference memory 260 is connected in signal communication with a first input of a motion/intra compensator 265. A second output of the reference memory 260 is connected in signal communication with a second input of a motion estimator 270. An output of the motion estimator 270 is connected in signal communication with a second input of the motion/intra compensator 265. An output of the motion/intra compensator 265 is connected in signal communication with a first input of a pre-filter 275. An output of the pre-filter 275 is connected in signal communication with a first input of an intra/inter selector 285. An output of the intra/inter selector 285 is connected in signal communication with a second non-inverting input of the combiner 210 and a second non-inverting input of the combiner 240. An output of the intra predictor 280 is connected in signal communication with a second input of the intra/inter selector 285. An output of the entropy coder 225 is available as an output of the video encoder 200, for outputting a bitstream. An output of the deblocking filter 250 is available as an output of the video encoder 200, for outputting a reconstruction. An input of the pre-filter 205 is available as an input of the video encoder, for receiving a video source and/or content related thereto. The pre-filter 205, the combiner 210, and the transformer (T) 215 form an equivalent forward lapped transform 266 with respect to an equivalent inverse lapped transform 277 formed from the inverse transformer (I) 235, the combiner 240, and the post-filter 245.

Figure 3:
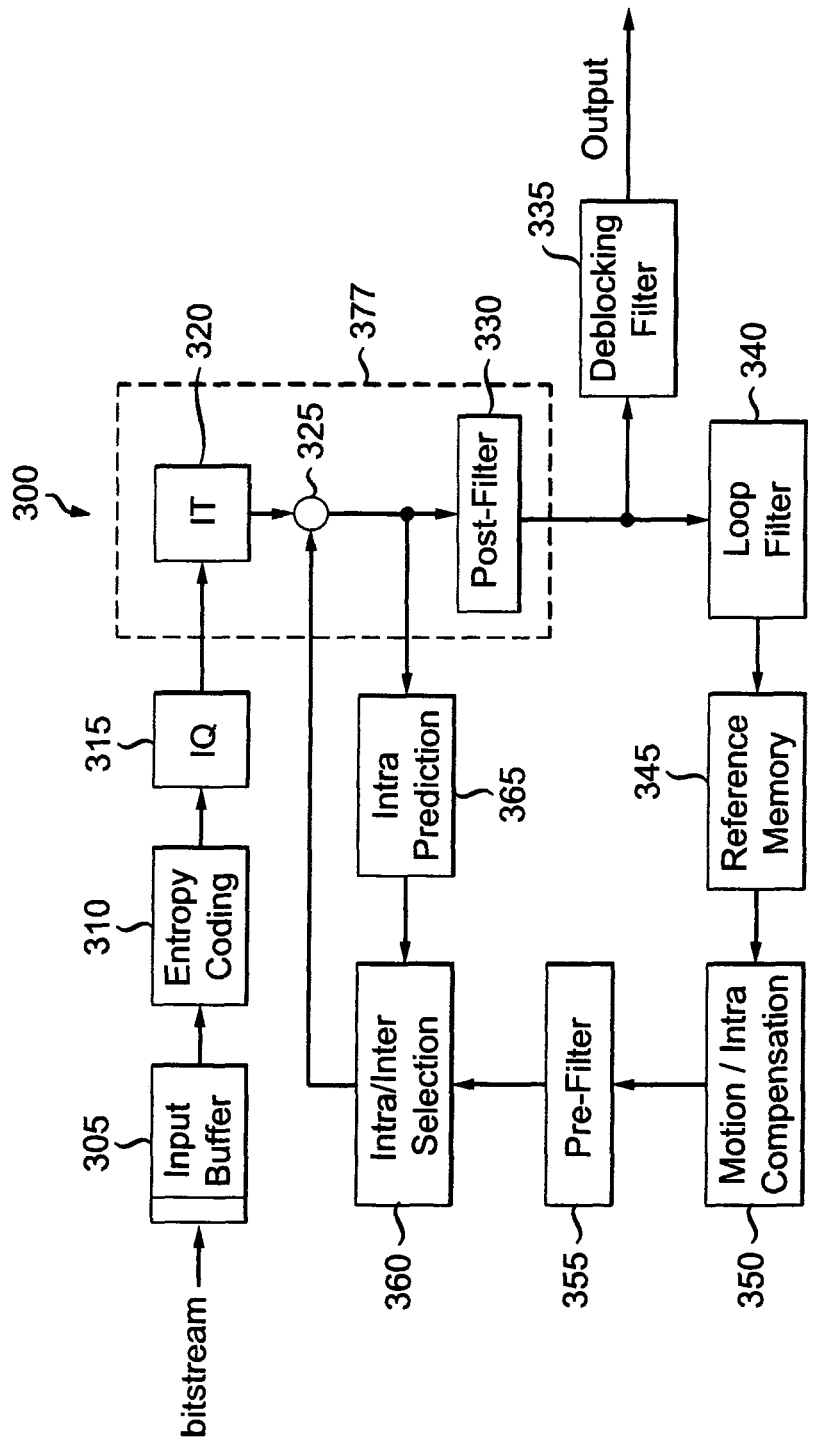
FIG. 3 is a block diagram showing an exemplary video decoder with pre-processing filters and post-processing filters, in accordance with an embodiment of the present principles.

Turning to FIG. 3, an exemplary video decoder with pre-processing filters and post-processing filters is indicated generally by the reference numeral 300. The video decoder 300 includes an input buffer 305 having an output connected in signal communication with an input of an entropy decoder 310. An output of the entropy decoder 310 is connected in signal communication with an input of an inverse quantizer 315. An output of the inverse quantizer 320 is connected in signal communication with a first non-inverting input of a combiner 325. An output of the combiner 325 is connected in signal communication with an input of a post-filter 330 and an input of an intra predictor 365. An output of the post-filter 330 is connected in signal communication with an input of a loop filter 340. An output of the loop filter 340 is connected in signal communication with an input of a reference memory 345. An output of the reference memory 345 is connected in signal communication with an input of a motion/intra compensator 350. An output of the motion/intra compensator 350 is connected in signal communication with an input of a pre-filter 355. An output of the pre-filter 355 is connected in signal communication with a first input of an intra/inter selector 360. An output of the intra/inter selector 360 is connected in signal communication with a second non-inverting input of the combiner 325. An output of the intra predictor 365 is connected in signal communication with a second input of the intra/inter selector 360. An input of the input buffer 305 is available as an input of the video encoder 300, for receiving an input bitstream. An output of the deblocking filter 335 is available as an output of the video decoder 300, for outputting one or more pictures corresponding to the bitstream. The inverse transformer (IT) 320, the combiner 325, and the post-filter 330 form an equivalent inverse lapped transform 377.

Thus, FIG. 2 shows an embodiment of a video encoder that pre-filters the original video source. The coupled post-processing filter 245 is placed outside the coding loop for intra-coding, but inside the coding loop for inter-coding. FIG. 3 shows the corresponding decoder, where the pre-processing filter 355 and post-processing filter 330 and their adaptation parameters are derived offline for the luma and chroma components separately. Separate parameters are also obtained for different sequence resolutions.

We note that while the pre-filters (e.g., 205 and 275) are not physically coupled to the post-filter 245, the pre-filters 205, 275 and the post-filter 245 are "coupled" in that they have a relationship such that the post-filter 245 operates in order to provide an output that is the same or as close as possible to the (pre-filtered) input to the pre-filter 205. That is, filter coefficients and parameters for the post-filter 245 are selected such that the filtering operation performed by the post-filter 245 is substantially inverse to the filtering operation performed by the pre-filters 205, 275

Figure 4:
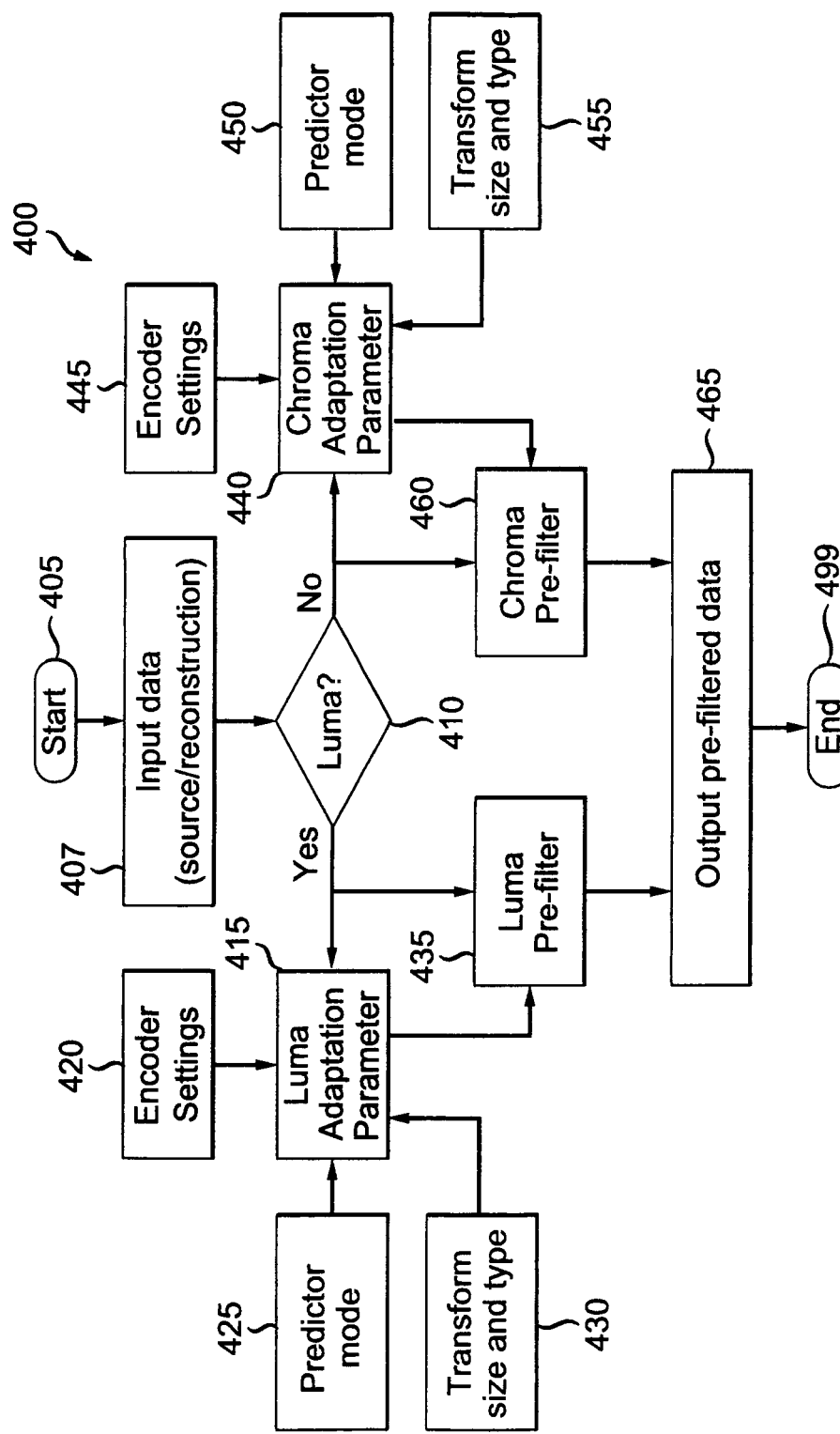
FIG. 4 is a flow diagram showing an exemplary method for encoding image data involving separate luma and chroma pre-filtering, in accordance with an embodiment of the present principles.

Turning to FIG. 4, an exemplary method for encoding image data involving separate luma and chroma pre-filtering is indicated generally by the reference numeral 400. The method 400 includes a start block 405 that passes control to a function block 407. The function block 407 inputs data (source/reconstruction data), and passes control to a decision block 410. The decision block 410 determines whether or not the current component to be filtered is the luma component. If so, then control is passed to a function block 415 and a function block 435. Otherwise, control is passed to a function block 440 and a function block 460. The function block 415 sets the luma adaptation parameter, and passes control to the function block 435. The function block 435 performs luma pre-filtering (using the luma adaptation parameter set by the function block 415), and passes control to a function block 465. The function block 465 outputs pre-filtered data, and passes control to an end block 499. The function block 440 sets the chroma adaptation parameter, and passes control to the function block 460. The function block 460 performs chroma pre-filtering (using the chroma adaptation parameter set by the function block 440), and passes control to the function block 465. Regarding function block 415, the same sets the luma adaptation parameter based on encoder settings 420, a predictor mode 425, and a transform size and type 430. Regarding function block 440, the same sets the chroma adaptation parameter based on encoder settings 445, a predictor mode 450, and a transform size and type 455.

Figure 5:
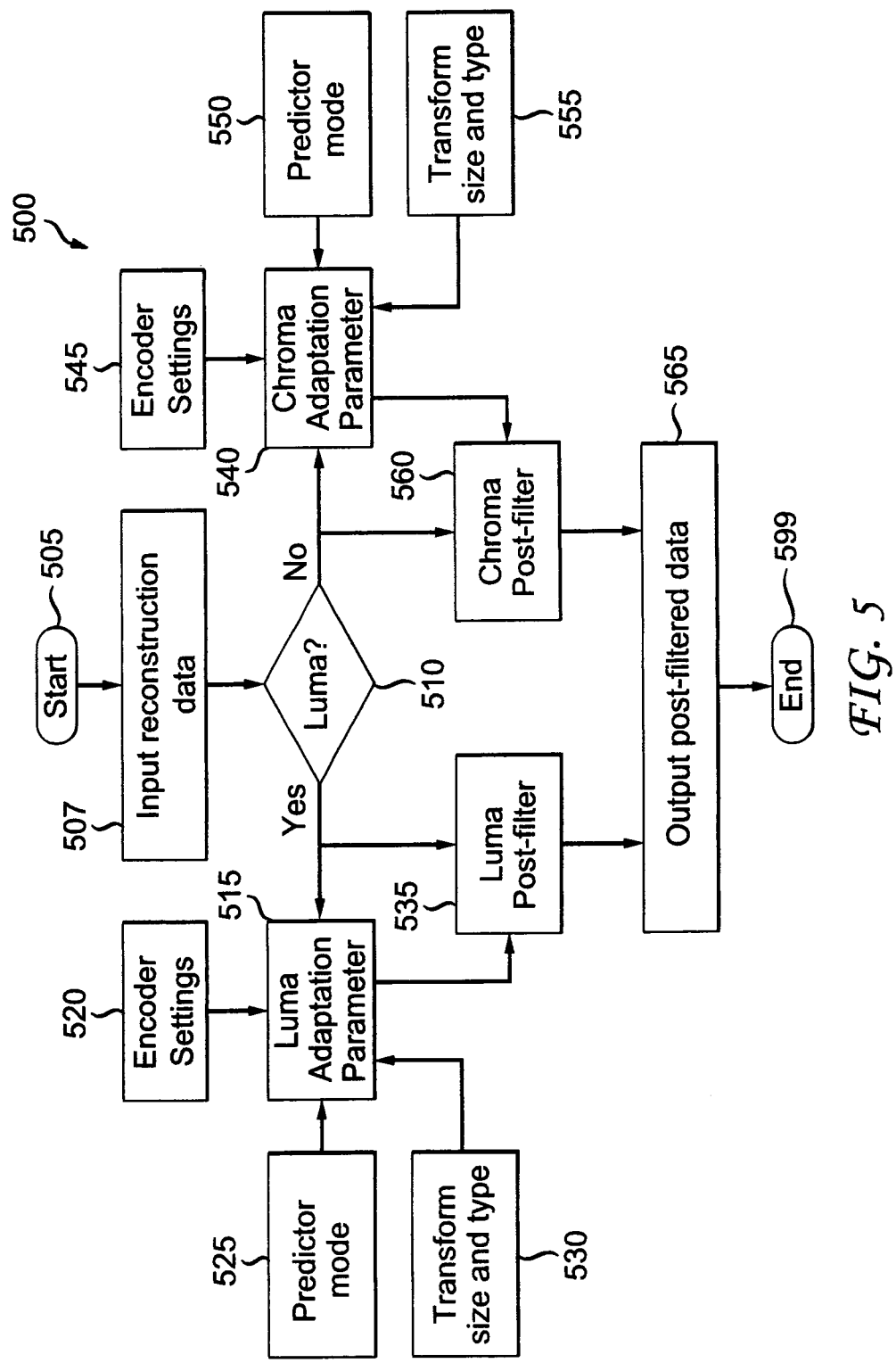
FIG. 5 is a flow diagram showing an exemplary method for decoding image data involving separate luma and chroma post-filtering, in accordance with an embodiment of the present principles.

Turning to FIG. 5, an exemplary method for decoding image data involving separate luma and chroma post-filtering is indicated generally by the reference numeral 500. The method 500 includes a start block 505 that passes control to a function block 507. The function block 507 inputs reconstruction data and passes control to a decision block 510. The decision block 510 determines whether or not the current component to be filtered is the luma component. If so, then control is passed to a function block 515 and a function block 535. Otherwise, control is passed to a function block 540 and a function block 560. The function block 515 sets the luma adaptation parameter, and passes control to the function block 535. The function block 535 performs luma post-filtering (using the luma adaptation parameter set by the function block 515), and passes control to a function block 565. The function block 565 outputs post-filtered data, and passes control to an end block 599. The function block 540 sets the chroma adaptation parameter, and passes control to the function block 560. The function block 560 performs chroma post-filtering (using the chroma adaptation parameter set by the function block 540), and passes control to the function block 565. Regarding function block 515, the same sets the luma adaptation parameter based on encoder settings 520, a predictor mode 525, and a transform size and type 530. Regarding function block 540, the same sets the chroma adaptation parameter based on encoder settings 545, a predictor mode 550, and a transform size and type 555.

Figure 6A:
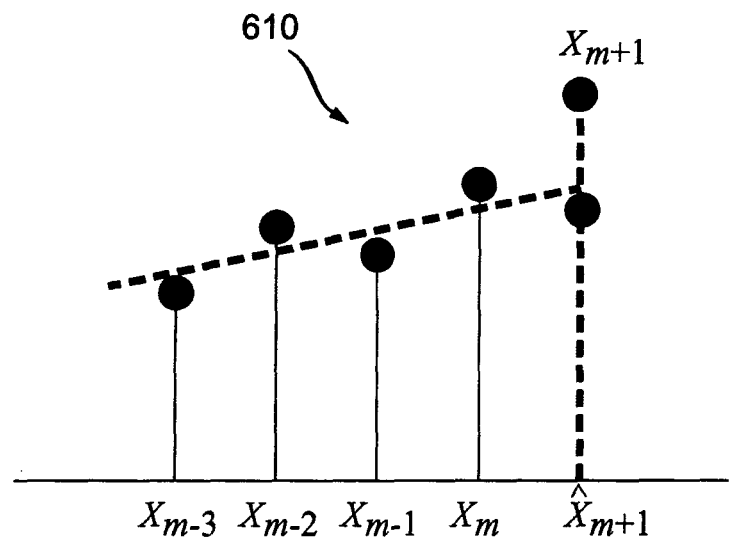
FIGS. 6A-6D are diagrams showing four possible choices for the function I (•,•) used to model predictive-coding (intra/inter), in accordance with an embodiment of the present principles.
Figure 6B:
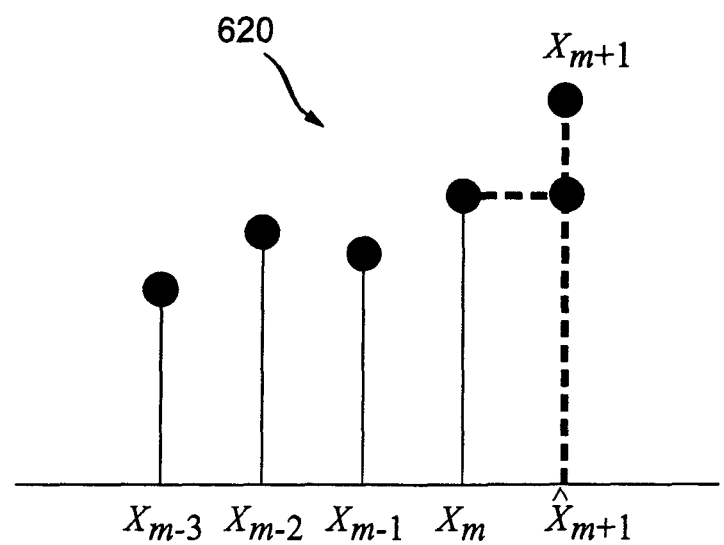
Figure 6C:
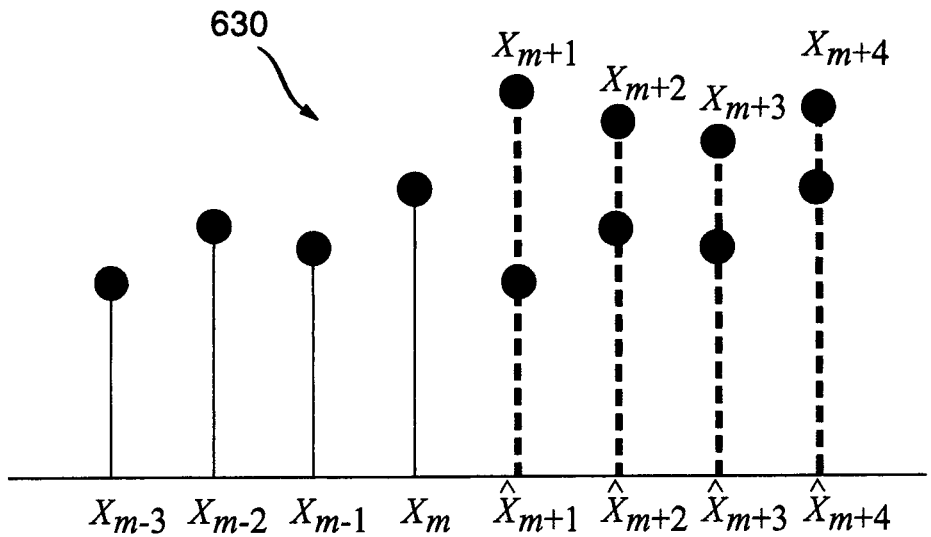
Figure 6D:
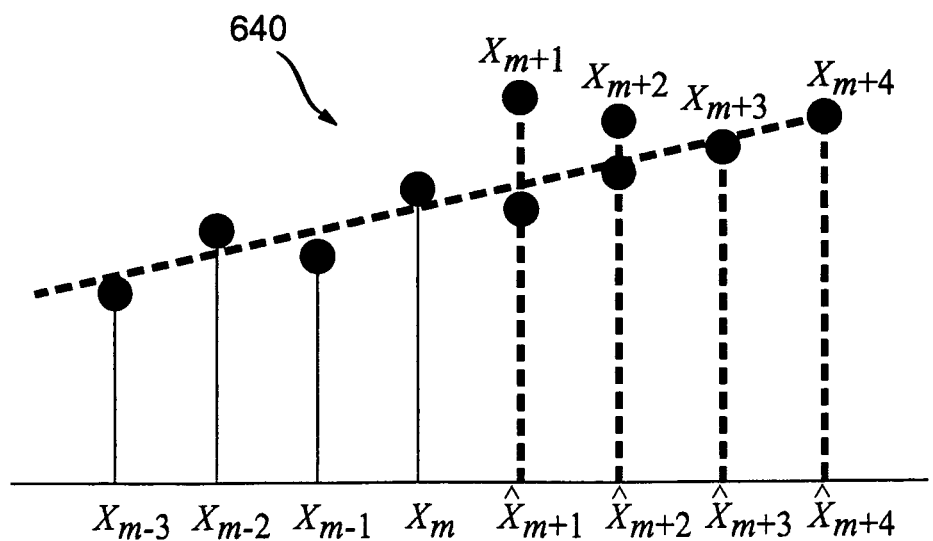

The parameter derivation begins with the design of a pre-filter. The time-domain representation of the pre-filter output is rewritten as follows:

$$y = D[\text{Shift}(I(Px, Prev(x)))] \quad (3)$$

where D is the block transform (e.g., Discrete cosine transform (DCT), Karhunen Loeve transform (KLT), and/or Mode dependent directional transform (MDDT)), and Prev (x) is the data used in predicting x. The function I (•,•) is modeled to capture the behavior of the predictor used for the coding scheme under consideration. Different models can be chosen to represent different predictors. Turning to FIGS. 4A-4D, four possible choices for the function I (•,•) used to model predictive-coding (intra/inter) are indicated generally by the reference numerals 610, 620, 630, and 640, respectively. In particular, FIG. 6A shows a choice 610 for the function where a line which minimizes the mean square error is fitted through the previous subset of pixels and extrapolated to obtain the prediction for the current pixels. FIG. 6B shows a choice 620 for the function where the previous pixel is copied as a prediction for the current pixel. FIG. 6C shows a choice 630 for the function where the previous block is copied as a prediction for the current block. FIG. 6D shows a choice 640 for the function where a line which minimizes the mean square error is fitted through the previous subset of pixels and extrapolated to obtain the prediction for the current blocks. The choices 610 and 620 can be recursively applied to obtain the prediction for the entire x under consideration.

For the pre-filtering approach in the MPEG-4 AVC Standard, variance $\sigma_{y_i}^2$ is calculated as follows:

$$\sigma_{y_i}^2 = Var[D[\text{Shift}(I(Px, Prev(x)))]] \quad (4)$$

The overall MPEG-4 AVC Standard pre-filter design problem can now be stated as follows:

$$P^* = \underset{P}{\text{argmax}} \left\{ \prod_{i=1}^{M} \left[ \left( \frac{Var[D[\text{Shift}(I(Px, Prev(x)))]]}{\sigma_x^2} \right) \right. \right.$$
$$\left. \left. \|D[\text{Shift}(I(P\cdot, Prev(\cdot)))]_i^{-1}\|^2 \right] \right\} \quad (5)$$

We approximate the above problem by the following (which corresponds to the assumption that the distortion increase in reconstruction due to the "inverse DCT" and "predictive-reconstruction" is a fixed multiple):

$$P^* \approx \underset{P}{\text{argmax}} \left\{ \prod_{i=1}^{M} \left[ \left( \frac{Var[D[\text{Shift}(I(Px, Prev(x)))]]}{\sigma_x^2} \right) \|P_i^{-1}\|^2 \right] \right\}^{-\frac{1}{M}} \quad (6)$$

In this way, in at least one implementation, a method of designing filters in accordance with the present principles incorporates the impact of pre-filtering on predictive-coding efficiency. Solutions obtained by solving Equation (6) can be further improved by using them as seeds for an evolutionary optimization algorithm.

Next system blocks such as the rate-distortion optimizer (which perform coding mode selection) and the most probable mode predictor are modified and trained to work in concert with the designed pre-processing filters and post-processing filters. The modification to the rate-distortion optimizer is an encoder only modification.

The pre-processing filter parameters and post-processing filter parameters, adaptation parameters and system parameters are obtained by maximizing an objective function, e.g., coding gain, energy compaction, frequency response, regularity in the basis, or a linear combination of some or all the above objectives. All the training and determination of parameters is performed offline on a representative sequence subset. Once the training is complete, these parameters can be used for all video sequences.

Figure 7:
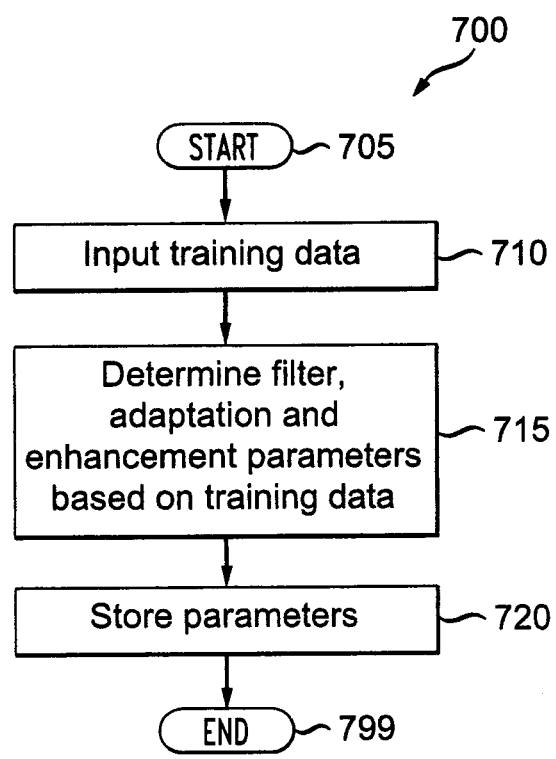
FIG. 7 is a flow diagram showing an exemplary method for offline training of filter, adaptation, and enhancement parameters, in accordance with an embodiment of the present principles.

Turning to FIG. 7, an exemplary method for offline training of filter, adaptation, and enhancement parameters is indicated generally by the reference numeral 700. The method 700 includes a start block 705 that passes control to a function block 710. The function block 710 inputs training data, and passes control to a function block 715. The function block 715 determines the filter, adaptation, and enhancement parameters based on the training data, and passes control to a function block 720. The function block 720 stores the parameters, and passes control to an end block 799.

The post-filter is coupled with the pre-filter to invert the processing carried out by the pre-filter. For non-adaptive fixed filters, the post-filter is the exact inverse of the pre-filter. Fixed filtering gives performance improvements over no filtering, but this performance improvement can be further enhanced by filter adaptation.

We now discuss the possible variants and embodiments for pre-filter adaptations and post-filter adaptations.

Adaptation:

If the adaptation in the pre-filter is based on the original data, then the post-filter cannot be a perfect inverse, due to the non-availability of the original data (e.g., at the decoder side). In such a case, the post-filter estimates the adaptation based on the data that is input to the post-filter. Two novel post-filtering embodiments are possible as follows.

In the first embodiment, we estimate the original data vector which, when adaptively pre-filtered, provides an output vector closest to the current observation. This estimation can be carried out using either convex or non-convex optimization.

Figure 8:
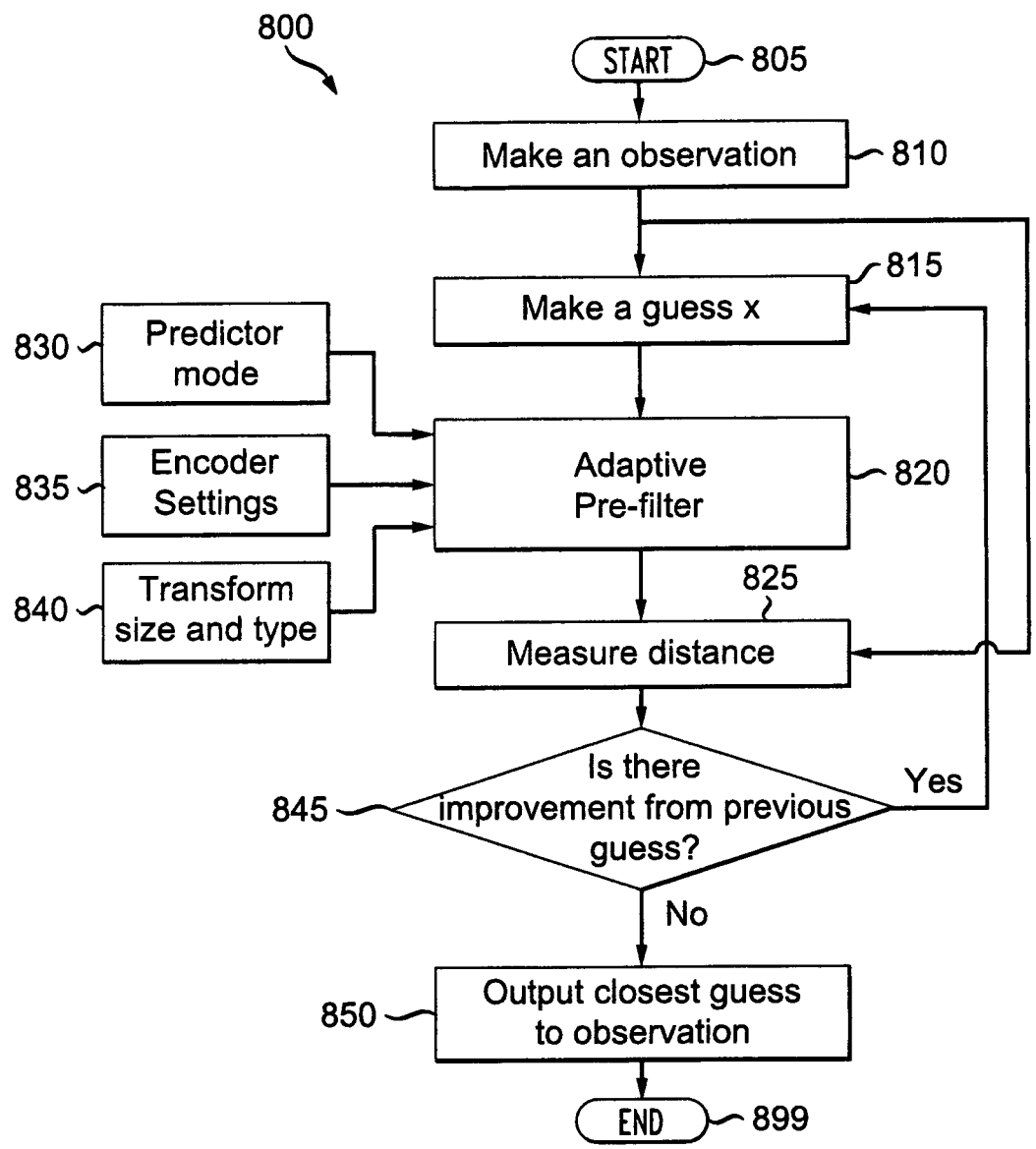
FIG. 8 is a flow diagram showing an exemplary method for performing post-filtering by minimizing the distance of a pre-filtered estimate to observed data, in accordance with an embodiment of the present principles.

Turning to FIG. 8, an exemplary method for performing post-filtering by minimizing the distance of a pre-filtered estimate to observed data is indicated generally by the reference numeral 800. The method 800 includes a start block 805 that passes control to a function block 810. The function block 810 receives an input observation, and passes control to a function block 815. The function block 815 makes a guess x, and passes control to a function block 820. The function block 820 performs adaptive filtering, and passes control to a function block 825. The function block 825 measures a distance from the guess to the observation, and passes control to a decision block 845. The decision block 845 determines whether or not there is an improvement from the previous guess (as determined from the distance). If so, then control is returned to the function block 815. Otherwise, control is passed to a function block 850. The function block 850 outputs the closest guess to the observation, and passes control to an end block 899. Regarding function block 820, the same performs the adaptive filtering based on encoder settings 835, a predictor mode 830, and a transform size and type 840.

In the second embodiment, we estimate the "adaptive pre-filter which was used" based on the observed data vector and calculate the inverse matrix corresponding to the post-filter transformation. This inverse matrix is then used to perform post-filtering. The selection of the pre-filter depends adaptively on the input data (and possibly other data such as, for example, the predictor mode or the encoding settings). Therefore, the selected pre-filter has to be deduced in order to apply the right post-filter to inverse the pre-filter process, that is, an estimation of the used pre-filter has to be performed. To deduce or estimate the pre-filter used in order to apply the proper post-filter, the decoder has available the filtered quantized data, that is, the decoder can observed and analyze the aforementioned data (e.g., including the input data, other data (e.g., predictor mode, encoding settings, etc.), and filtered quantized data) to perform the estimation of the employed pre-filter and then, calculate the inverse matrix corresponding to the post-filter.

The above mentioned approaches to post-filtering make the post-filter an approximate inverse of the pre-filter.

Figure 9:
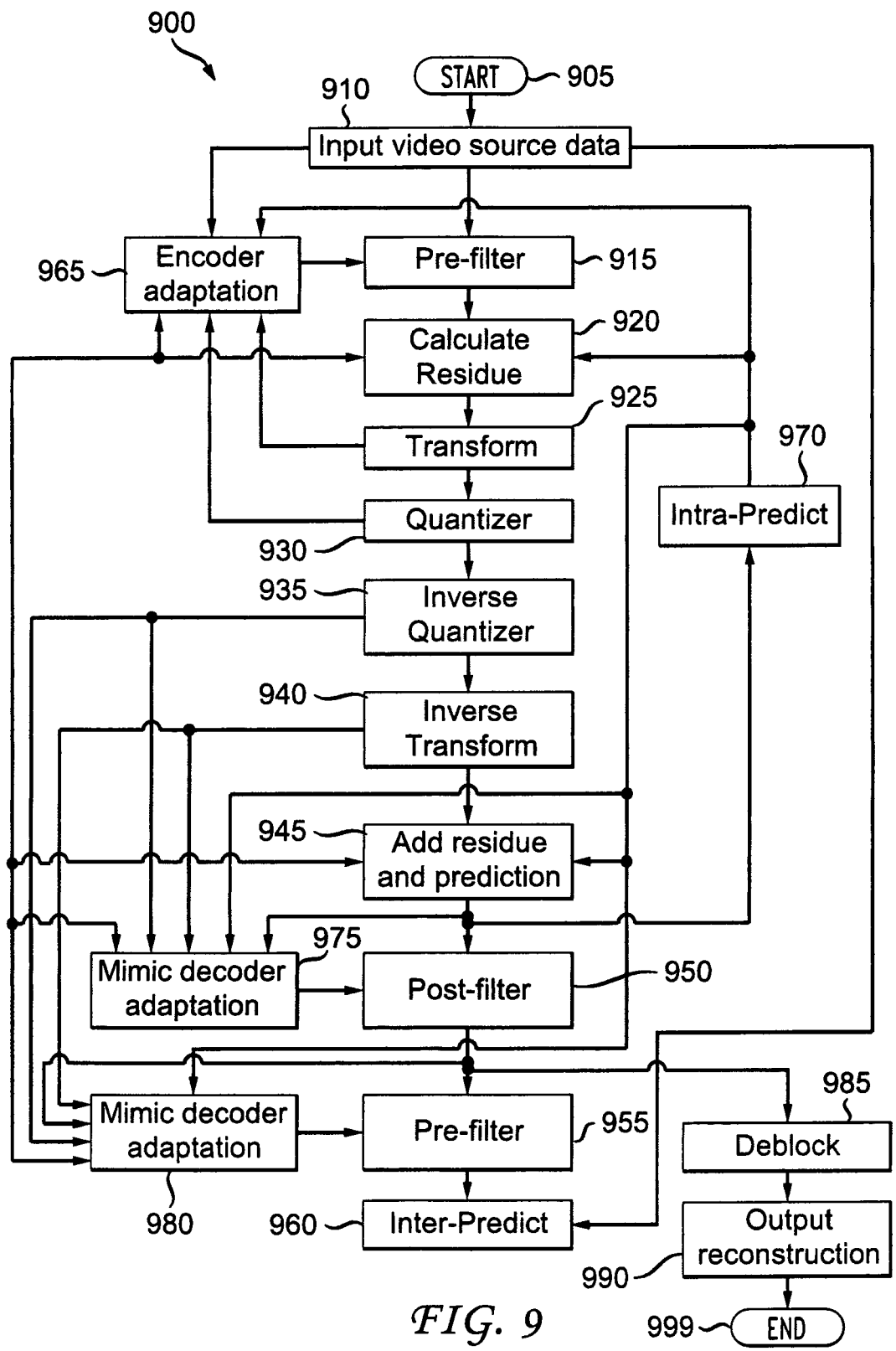
FIG. 9 is a flow diagram showing an exemplary method for encoding video data with pre-processing filtering and post-processing filtering, in accordance with an embodiment of the present principles.

Turning to FIG. 9, an exemplary method for encoding video data with pre-processing filtering and post-processing filtering is indicated generally by the reference numeral 900. The method 900 includes a start block 905 that passes control to a function block 910. The function block 910 inputs video source data, and passes control to a function block 915, a function block 965, and a function block 960. The function block 915 pre-filters the video source data, and passes control to a function block 920. The function block 920 calculates a residue (e.g., the difference between an original picture from the video source data and a reference picture, the reference picture also known as a prediction) for the video source data, and passes control to a function block 925. The function block 925 applies a transform to the residue to obtain coefficients there for, and passes control to a function block 930 and the function block 965. The function block 930 quantizes the coefficients to obtain quantized coefficients, and passes control to a function block 935 and the function block 965. The function 935 inverse quantizes the quantized coefficients to obtain inverse quantized coefficients, and passes control to a function block 940, a function block 975, and a function block 980. The function block 940 applies an inverse transform to the inverse quantized coefficients to obtain a reconstructed residue, and passes control to a function block 945, the function block 975, and the function block 980. The function block 945 adds the reconstructed residue to the prediction to obtain a reconstructed picture, and passes control to a function block 950, the function block 975, and a function block 970. The function block 950 performs post-filtering with respect to the reconstructed picture to obtain a reconstructed and post-filtered picture, and passes control to a function block 955. The function block 955 performs pre-filtering of the reconstructed and post-filtered picture, and passes control to the function block 960. The function block 960 performs inter-prediction, and returns control to the function block 920, the function block 945, the function block 975, the function block 965, and the function block 980. The function block 965 performs an encoder adaptation involving the pre-filter selection, and returns control to the function block 915. The function block 970 performs an intra prediction, and returns control to the function block 980, the function block 945, the function block 975, the function block 920, and the function block 965. The function block 985 performs deblocking filtering, and passes control to a function block 990. The function block 990 outputs a reconstruction, and passes control to an end block 999. The function block 975 mimics a decoder adaptation, and passes control to the function block 950. The function block 980 mimics a decoder adaptation, and passes control to a function block 955.

Figure 10:
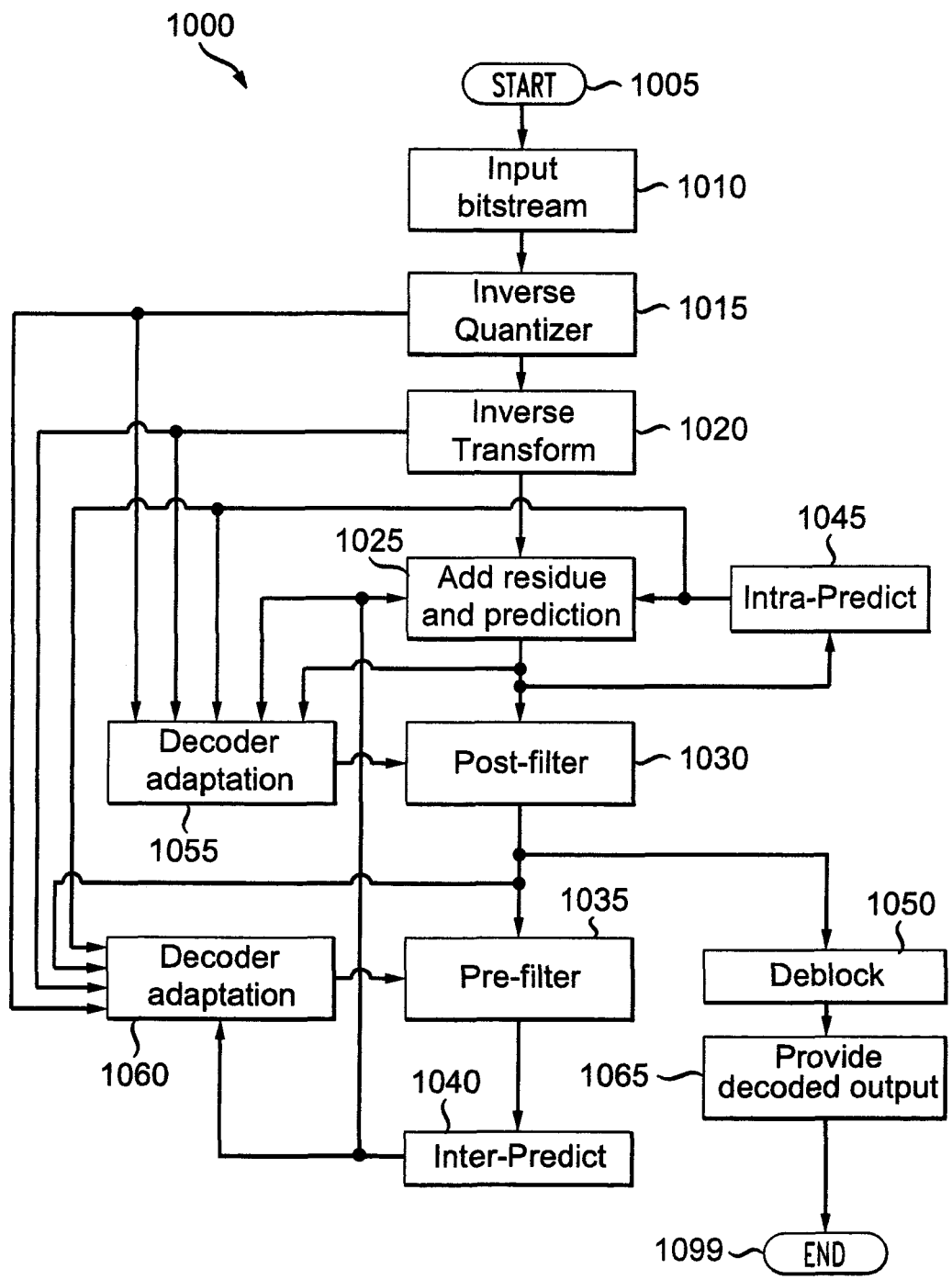
FIG. 10 is a flow diagram showing an exemplary method for decoding video data with pre-processing filtering and post-processing filtering, in accordance with an embodiment of the present principles.

Turning to FIG. 10, an exemplary method for decoding video data with pre-processing filtering and post-processing filtering is indicated generally by the reference numeral 1000. The method 1000 includes a start block 1005 that passes control to a function block 1010. The function block 1010 inputs a bitstream, and passes control to a function block 1015. The function block 1015 inverse quantizes the quantized residue in the bitstream to obtain coefficients there for, and passes control to a function block 1020, a function block 1055, and a function block 1060. The function block 1020 inverse transforms the coefficients to obtain a residue (e.g., for a picture in the bitstream), and passes control to a function block 1025, the function block 1055, and the function block 1060. The function block 1025 adds the residue to a prediction to obtain a reconstructed picture, and passes control to a function block 1030, the function block 1055, and a function block 1045. The function block 1030 performs post-filtering with respect to the reconstructed picture to obtain a reconstructed and post-filtered picture, and passes control to a function block 1035, the function block 1060, and a function block 1050. The function block 1035 performs pre-filtering of the reconstructed and post-filtered picture, and passes control to a function block 1040. The function block 1040 performs inter-prediction, and returns control to the function block 1060, the function block 1055, and the function block 1025. The function block 1045 performs intra-prediction, and passes control to the function block 1025, the function block 1060, and the function block 1055. The function block 1050 performs deblocking filtering, and passes control to a function block 1065. The function block 1065 provides a decoded output, and passes control to an end block 1099.

In another embodiment, if the pre-filters and post-filters are implemented using a lifting scheme, then the adaptation can be embedded within the lifting mechanism. In such a case the adaptation at the pre-filter can be perfectly reversed at the post-filter.

Figure 11:
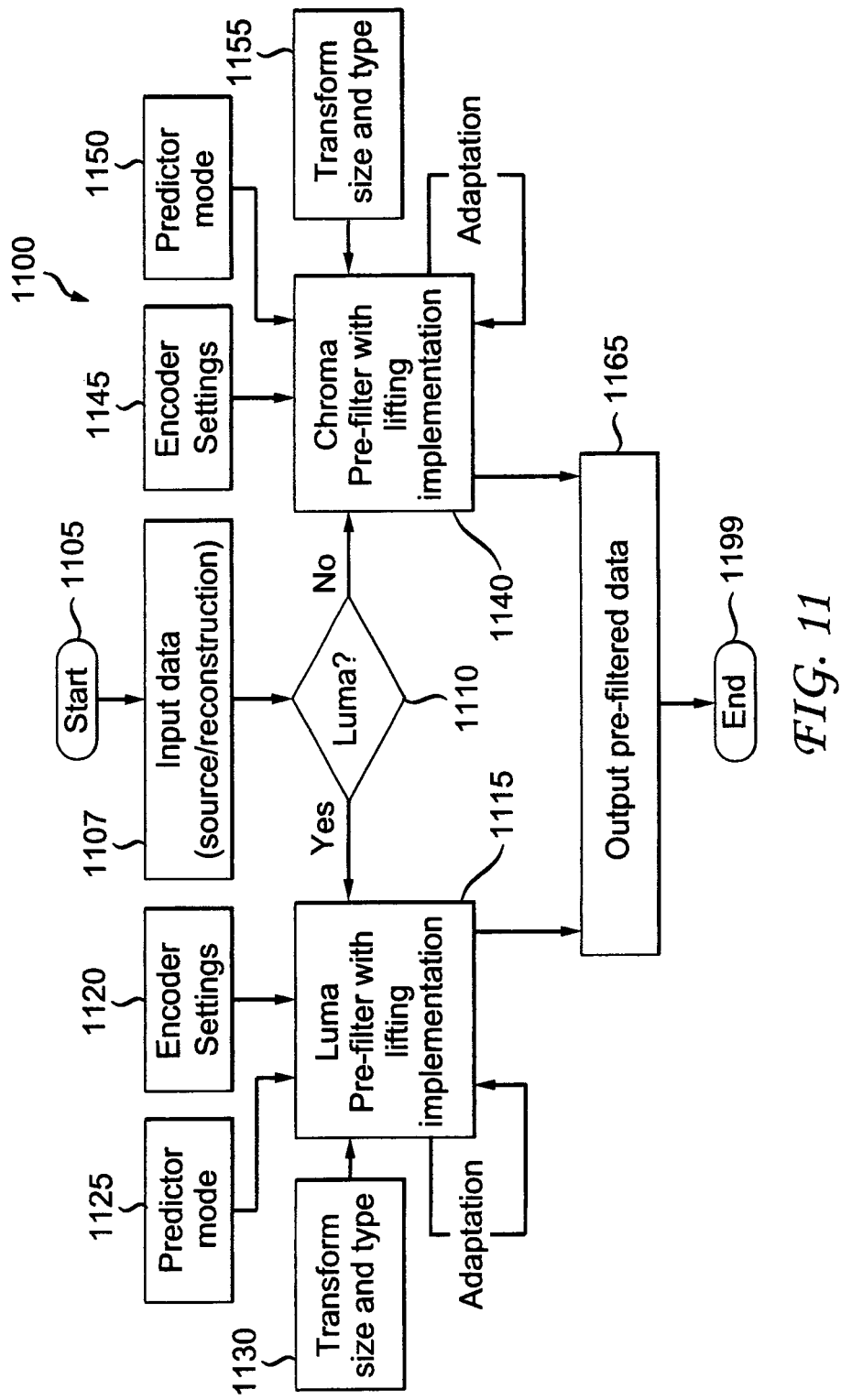
FIG. 11 is a flow diagram showing an exemplary method for encoding image data involving separate luma and chroma pre-filtering, in accordance with an embodiment of the present principles.

Turning to FIG. 11, an exemplary method for encoding image data involving separate luma and chroma pre-filtering with a lifting scheme is indicated generally by the reference numeral 1100. The method 1100 includes a start block 1105 that passes control to a function block 1107. The function block 1107 inputs data (source/reconstruction data), and passes control to a decision block 1110. The decision block 1110 determines whether or not the current component to be filtered is the luma component. If so, then control is passed to a function block 1115. Otherwise, control is passed to a function block 1140. The function block 1115 performs luma pre-filtering with a lifting implementation, and passes control to a function block 1165. The function block 1165 outputs pre-filtered data, and passes control to an end block 1199. The function block 1140 performs chroma pre-filtering with a lifting implementation, and passes control to the function block 1165. Regarding function block 1115, the same performs the luma pre-filtering with the lifting implementation and with an adaptation based on encoder settings 1120, a predictor mode 1125, and a transform size and type 1130. Regarding function block 1140, the same performs the chroma pre-filtering with the lifting implementation and with an adaptation based on encoder settings 1145, a predictor mode 1150, and a transform size and type 1155.

Figure 12:
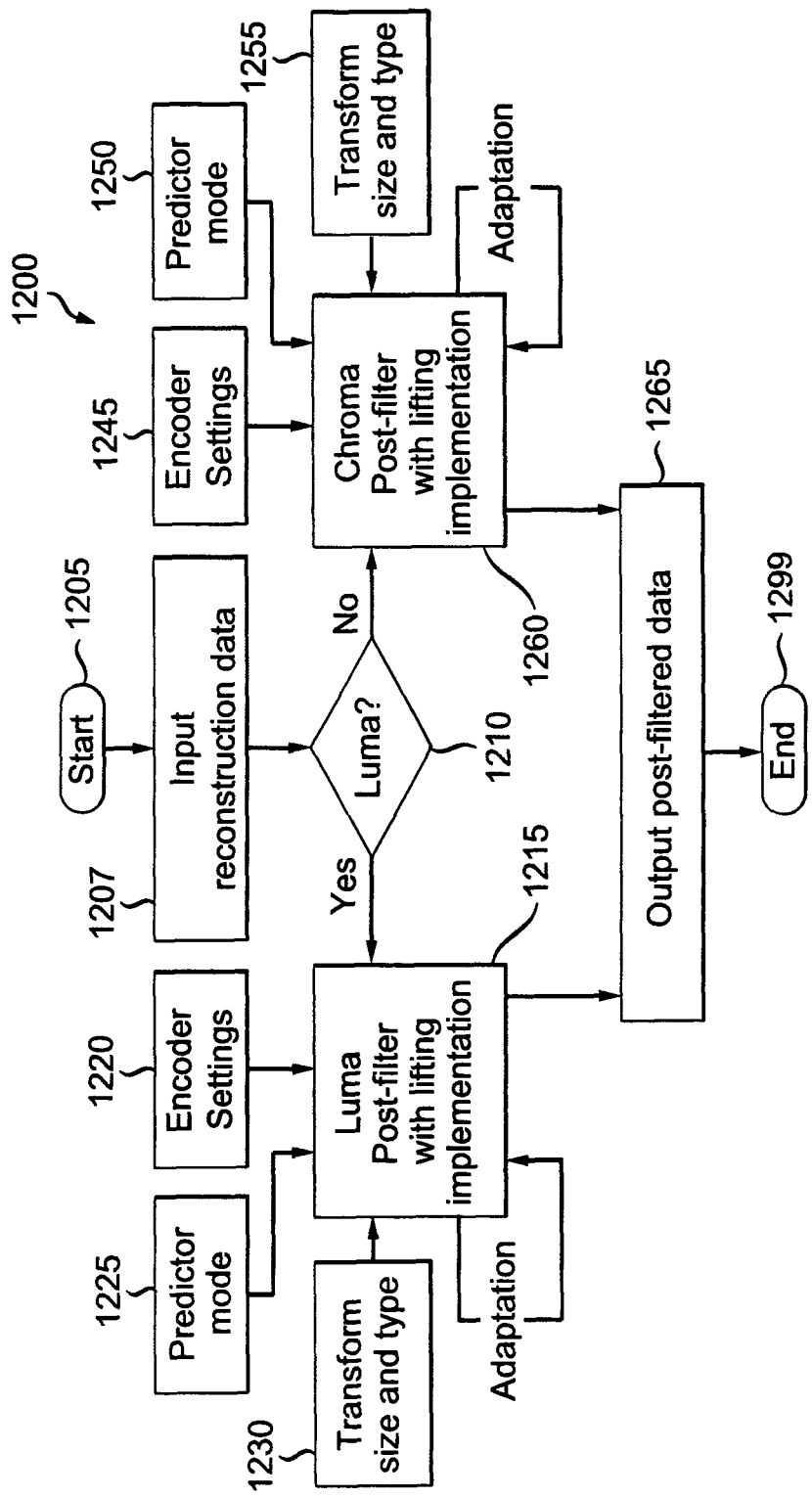
FIG. 12 is a flow diagram showing an exemplary method for decoding image data involving separate luma and chroma post-filtering, in accordance with an embodiment of the present principles.

Turning to FIG. 12, an exemplary method for decoding image data involving separate luma and chroma post-filtering is indicated generally by the reference numeral 1200. The method 1200 includes a start block 1205 that passes control to a function block 1207. The function block 1207 inputs reconstruction data, and passes control to a decision block 1210. The decision block 1210 determines whether or not the current component to be filtered is the luma component. If so, then control is passed to a function block 1215. Otherwise, control is passed to a function block 1260. The function block 1215 performs luma post-filtering with a lifting implementation, and passes control to a function block 1265. The function block 1265 outputs post-filtered data, and passes control to an end block 1299. The function block 1260 performs chroma post-filtering with a lifting implementation, and passes control to the function block 1265. Regarding function block 1215, the same performs the luma post-filtering with the lifting implementation and with an adaptation based on encoder settings 1220, a predictor mode 1225, and a transform size and type 1230. Regarding function block 1260, the same performs the chroma post-filtering with the lifting implementation and with an adaptation based on encoder settings 1245, a predictor mode 1250, and a transform size and type 1255.

The lifting implementation can be carried out by first decomposing a fixed pre-filter transform matrix using singular value decomposition. The singular value decomposition will yield a product of three matrices. The first and the third matrix are orthogonal matrices. As it is known, every orthogonal matrix can be decomposed into a series of Givens plane rotations (the number of such rotations is related to the dimension of the matrix, where we preferably employ the mathematical operation "N choose 2", that is, if n is the dimension of the matrix, then the number of rotations is $n*(n-1)/2$). Each plane rotation, in turn, can be implemented using three lifting steps as follows: Predict-Update-Predict. The second matrix obtained from the singular value decomposition is a diagonal matrix and corresponds to scaling. A novel adaptation technique which can be used in the lifting implementation is to change the values of the diagonal matrix. The values are changed in a way that such values can be exactly or approximately reversed at the decoder. The post-filter lifting implementation is obtained by reversing the individual lifting steps carried out by the pre-filter.

Figure 13:
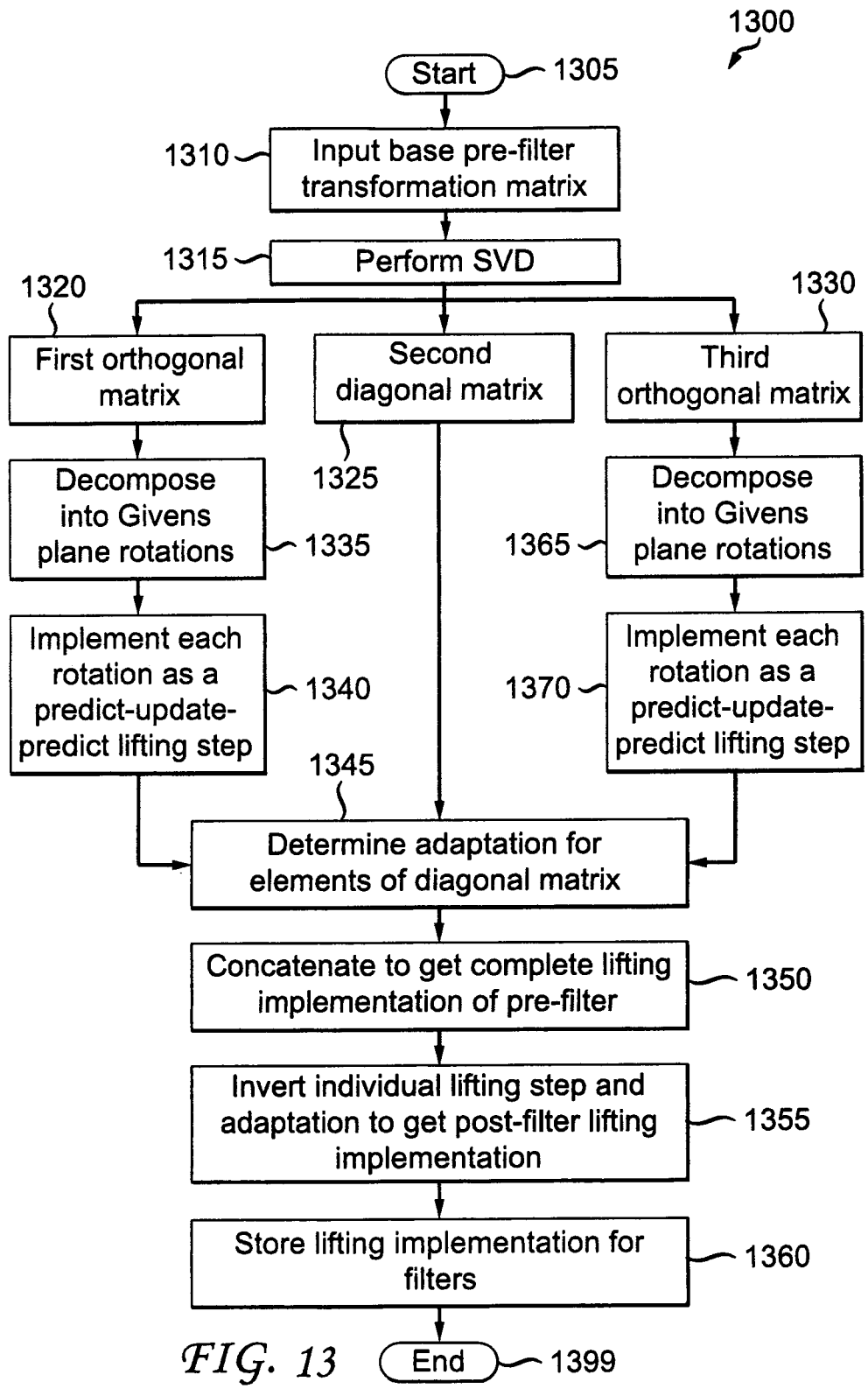
FIG. 13 is a flow diagram showing an exemplary method for performing adaptive pre-filtering and post-filtering using singular value decomposition (SVD) in a lifting implementation, in accordance with an embodiment of the present principles.

Turning to FIG. 13, an exemplary method for performing adaptive pre-filtering and post-filtering using singular value decomposition (SVD) in a lifting implementation is indicated generally by the reference numeral 1300. The method 1300 includes a start block 1305 that passes control to a function block 1310. The function block 1310 inputs a base pre-filter transformation matrix, and passes control to a function block 1315. The function block 1315 performs singular value decomposition (SVD), and passes control to a function block 1320, a function block 1325, and a function block 1330. The function block 1320 receives a first orthogonal matrix as a first output of the SVD (performed by the function block 1315), and passes control to a function block 1335. The function block 1325 receives a second diagonal matrix as a second output of the SVD (performed by the function block 1315), and passes control to a function block 1345. The function block 1330 receives a third orthogonal matrix as a third output of the SVD (performed by the function block 1315), and passes control to a function block 1365. The function block 1335 decomposes the first orthogonal matrix into given plane rotations, and passes control to a function block 1340. The function block 1340 implements each rotation as a predict-update-predict lifting step, and passes control to the function block 1345. The function block 1345 determines an adaptation for the elements of the diagonal matrix, and passes control to a function block 1350. The function block 1350 concatenates the lifting steps of 1340, the scaling matrix with the adaptation elements of 1345 and the lifting steps of 1370 to get a complete lifting implementation of a pre-filter, and passes control to a function block 1355. The function block 1355 inverts the individual lifting step and adaptation to get a post-filter lifting implementation, and passes control to a function block 1360. The function block 1360 stores the lifting implementations for the filters, and passes control to an end block 1399. The function block 1365 decomposes the third orthogonal matrix into given plane rotations, and passes control to a function block 1370. The function block 1370 implements each rotation as a predict-update-predict lifting step, and passes control to the function block 1345.

Other novel ways of determining lifting implementations of a fixed pre-filter and post-filter involve matrix decomposition such as QR decomposition, PLUS decomposition. Using Gaussian elimination (with row transformation only), one can reduce the pre-filter transform matrix to the identity matrix. Each row transformation is a lifting step. These lifting steps when concatenated lead to the post-filter lifting implementation. Reversing the steps in the post-filter will give the pre-filter implementation.

Figure 14:
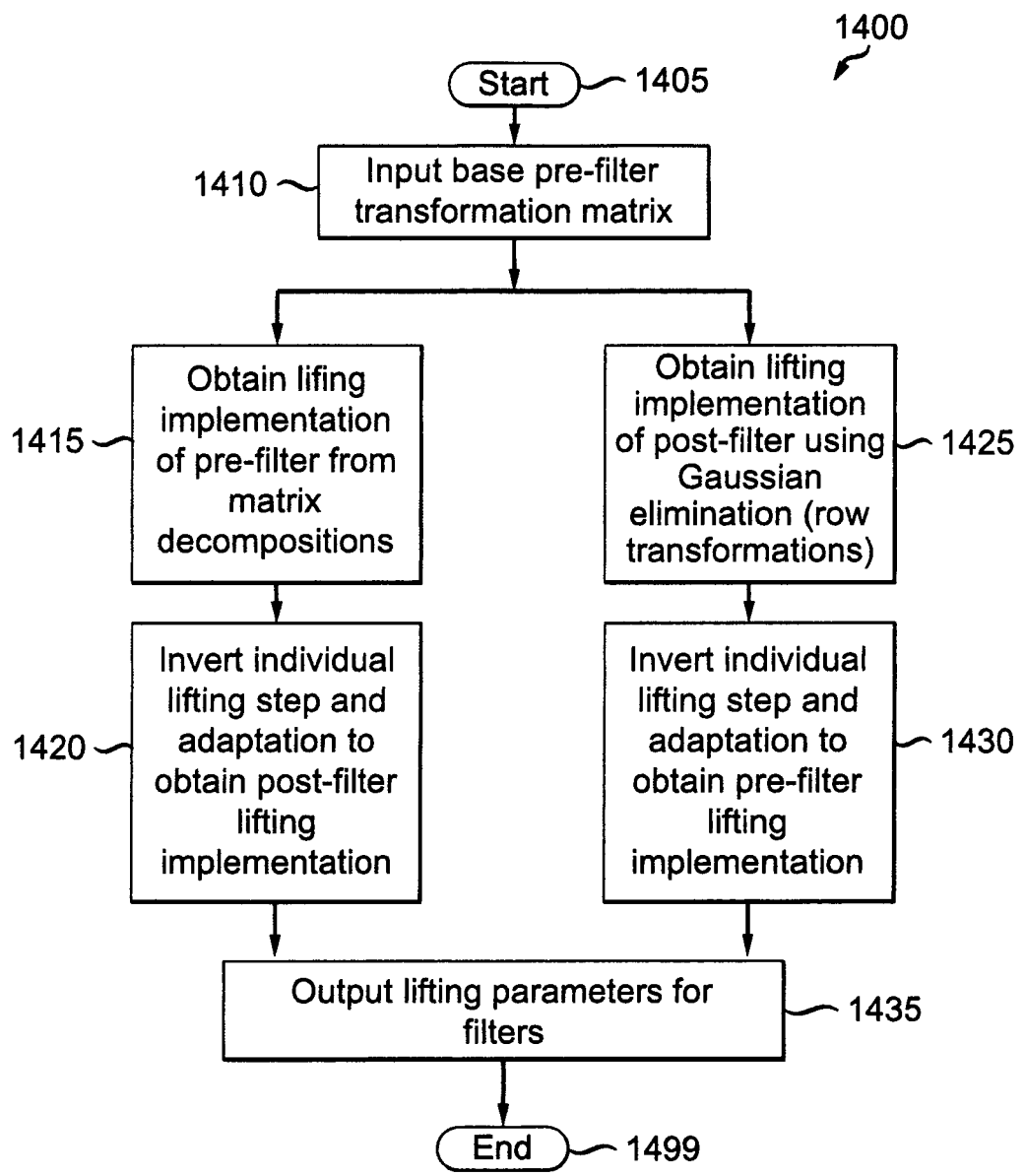
FIG. 14 is a flow diagram showing an exemplary method for deriving a lifting implementation of filters using matrix decomposition or Gaussian elimination, in accordance with an embodiment of the present principles.

Turning to FIG. 14, an exemplary method for deriving a lifting implementation of filters using matrix decomposition or Gaussian elimination is indicated generally by the reference numeral 1400. The method 1400 includes a start block 1405 that passes control to a function block 1410. The function block 1410 inputs a base pre-filter transformation matrix, and passes control to a function block 1415 and a function block 1425. The function block 1415 obtains a lifting implementation of a pre-filter from matrix decompositions (of the base pre-filter transformation matrix input by function block 1410), and passes control to a function block 1420. The function block 1425 obtains a lifting implementation of a post-filter using Gaussian elimination (row transformations, with respect to the base pre-filter transformation matrix input by function block 1410), and passes control to a function block 1430. The function block 1420 inverts an individual lifting step and adaptation to obtain a post-filter lifting implementation, and passes control to a function block 1435. The function block 1430 inverts an individual lifting step and adaptation to obtain a pre-filter lifting implementation, and passes control to the function block 1435. The function block 1435 stores the lifting implementation for the filters, and passes control to an end block 1499. Thus, regarding method 1400, adaptation can then be carried out in one or more lifting steps (in a perfectly reversible or approximately reversible fashion).

The filter adaptation which is derived from input data will be based on characteristics such as data gradient strength and/or data gradient direction and/or data variance. This novel adaptation can be made discrete by partitioning the gradient strength and/or gradient direction and/or gradient variance into disjoint ranges and applying fixed filters for different ranges. This can be thought of as adaptation based on a lookup table. In another embodiment, this adaptation is a continuous function of gradient strength and/or gradient direction and/or data variance. A choice of gradient adaptation function which provides good performance is a function which exponentially decreases as the gradient increases. Gradient can be calculated as the difference between pixels being pre-filtered. For a more accurate measure of gradient the pixel difference may include pixels beyond the pre-filter boundary and weighted appropriately. Since we are interested in detecting edges using the gradient, by considering only the magnitude of the gradient we can obtain a better ability to detect edges.

The process of adaptation is further enhanced by the following:
 Choosing different adaptive pre-filters and post-filters for the horizontal and vertical directions.
 Applying the adaptive pre-filters and post-filters selectively:
  To the transform block boundary only;
  To the transform block boundary and within the transform block; and/or
  Turning off the pre-filter and post-filter.

One novel feature of the adaptive pre-filter and post-filter is the ability to work with different transforms (discrete cosine transform (DCT), Karhunen-Loeve transform (KLT), mode-dependent directional transform (MDDT)) and different transform sizes. Previous work restricted the pre-filter and post-filter combination to work with a single transform and transform size. FIGS. 4 and 5 described above illustrate an embodiment relating to the aforementioned adaptation. For example, referring to FIGS. 4 and 5, it can be seen that the pre-processing filter and post-processing filters adapt their behavior according to several inputs including encoder settings, prediction mode, transform type/size and the input data.

System Enhancements:

The performance of the pre-filter and post-filter can be improved by modifying certain encoder and decoder functions and making such functions work in harmony with the filtering process. The choice of different pre-filters and post-filters for the luma and chroma components changes the coding efficiency of the two channels differently. This change in coding efficiency implies that the rate-distortion optimizer needs to be modified in order to reflect the new coding efficiency and make better mode decisions. One simplistic way of reflecting this change in coding efficiency is to change the Lagrangian parameter for luma and chroma in the encoder and/or decoder. Changing the Lagrangian parameter to a function which accurately reflects the coding efficiency significantly improves the overall compression efficiency.

Figure 15:
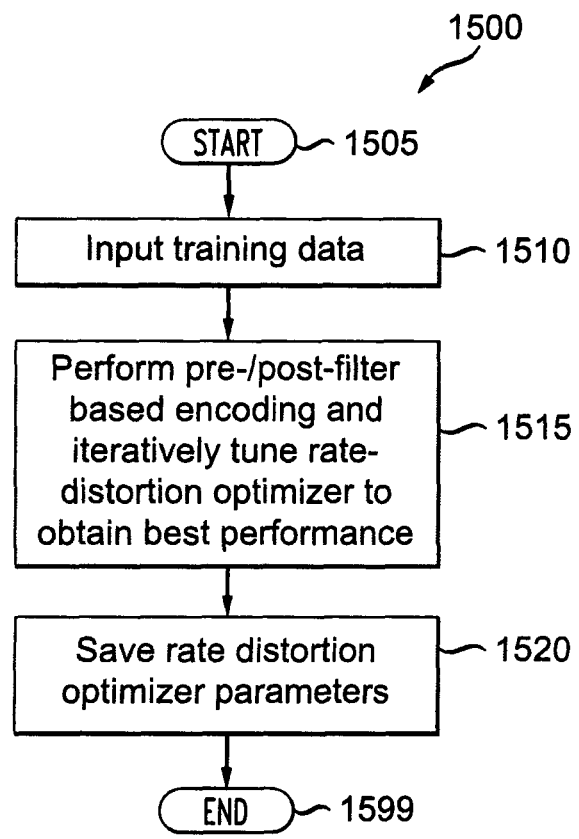
FIG. 15 is a flow diagram showing an exemplary method for training a rate-distortion optimizer, in accordance with an embodiment of the present principles.

Turning to FIG. 15, an exemplary method for training a rate-distortion optimizer is indicated generally by the reference numeral 1500. The method 1500 includes a start block 1505 that passes control to a function block 1510. The function block 1510 inputs training data, and passes control to a function block 1515. The function block 1515 performs pre-/post-filter based encoding and iteratively tunes the rate-distortion optimizer to obtain the best performance (e.g., based on a rate-distortion cost), and passes control to a function block 1520. The function block 1520 saves the rate distortion parameters, and passes control to an end block 1599. It is to be appreciated that method 1500 pertains to the encoder side only and, thus, does not impact the decoder.

The coding mode predictor used in the MPEG-4 AVC Standard video encoder or decoder makes a guess on the most probable coding mode for the current block based on blocks coded in the past. Often the blocks on which the predictions are based are spatially or temporally adjacent to the current block. If the predictor makes an accurate guess for the best coding mode for the current block, a minimum number of bits is used to code this mode. An accurate predictor can lead to significant bitrate savings. The pre-filtering process and post-filtering process impact the prediction process making the prediction process less accurate. Using a subset of sequences for training, we can re-design the mode predictor to be more accurate under the filtering.

Figure 16:
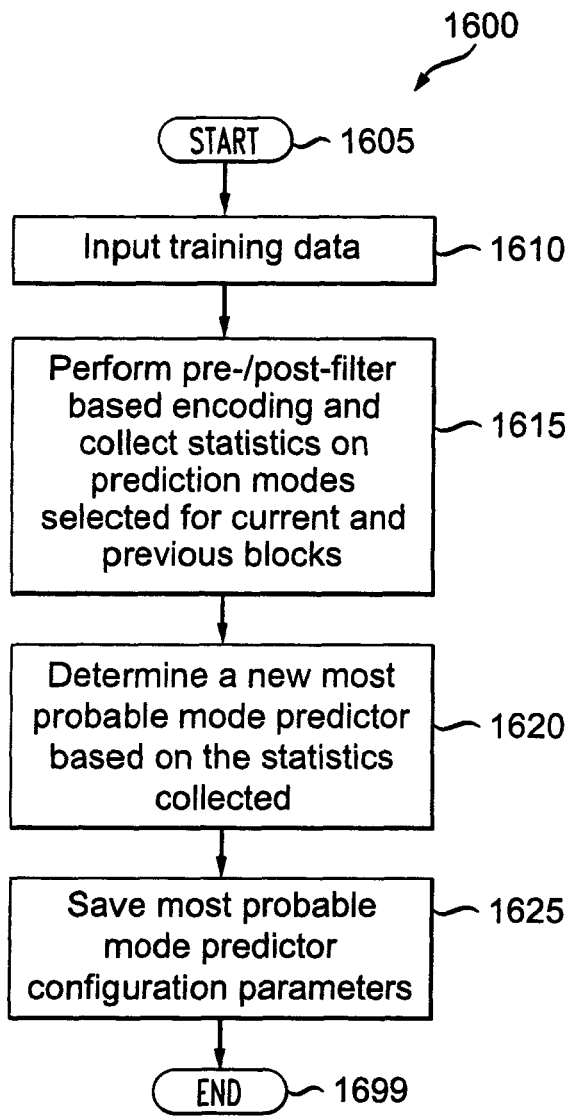
FIG. 16 is a flow diagram showing an exemplary method for training a most probable mode predictor, in accordance with an embodiment of the present principles.

Turning to FIG. 16, an exemplary method for training a most probable mode predictor is indicated generally by the reference numeral 1600. The method 1600 includes a start block 1605 that passes control to a function block 1610. The function block 1610 performs pre-/post-filter based encoding and collects statistics on prediction modes selected for the current and previous blocks, and passes control to a function block 1620. The function block 1620 determines a new most probable mode predictor based on the statistics collected, and passes control to a function block 1625. The function block 1625 stores the most probable mode predictor configuration parameters, and passes control to an end block 1699. It is to be appreciated that the most probable mode predictor can be re-designed based on maximum likelihood estimator, maximum a posteriori estimator, or any other suitable estimator.

Speeding Up Post-Filter Hardware Implementation:

Often the adaptation process in the pre-filter is as simple as scaling the pre-filter parameters by a floating point value, for example, s. An example for a 4×4 pre-filter is shown below as follows:

$$\begin{bmatrix} y_0 \\ y_1 \\ y_2 \\ y_3 \end{bmatrix} = \underbrace{\left[ I + \frac{s}{scaling} \underbrace{\begin{bmatrix} p_{00} & p_{01} & -p_{01} & -p_{00} \\ p_{10} & p_{11} & -p_{11} & -p_{10} \\ -p_{10} & -p_{11} & p_{11} & p_{10} \\ -p_{00} & -p_{01} & p_{01} & p_{00} \end{bmatrix}}_{Pre-filter\ parameters} \right]}_{Adaptive\ pre-filter} \begin{bmatrix} x_0 \\ x_1 \\ x_2 \\ x_3 \end{bmatrix} \quad (7)$$

$$= P(s)x$$

A hardware implementation of the post-filter which reverses the adaptive pre-filter has to change its inversion logic based on this adaptation. A direct "matrix inverse" of the above expression leads to a 4×4 matrix where every term of the matrix needs to be changed based on the scaling parameter s. A better way would be to isolate the scaling parameter to as few matrix elements as possible. Towards this end, the following novel post-filter is proposed:

$$P(s)^{-1} = I_{4 \times 4} + Q(s) \quad (8)$$

We can decompose Q(s=const), where the constant is typically chosen as 1, using singular value decomposition into three matrices. The first matrix ($U_i$) and the third matrix ($V_i$) are orthogonal matrices. We can now absorb any variation in the scaling parameter s in the second matrix of the singular value decomposition as follows:

$$P(s)^{-1} = I_{4 \times 4} + U_i \begin{bmatrix} 0 & 0 & 0 & 0 \\ 0 & 0 & 0 & 0 \\ 0 & 0 & m_{22}s + c_{22} & m_{23}s + c_{23} \\ 0 & 0 & m_{32}s + c_{32} & m_{33}s + c_{33} \end{bmatrix} V_i \quad (9)$$

The parameters $m_{22}$, $m_{23}$, $m_{32}$, $m_{33}$ and $c_{22}$, $c_{23}$, $c_{32}$, $c_{33}$ are constants determined uniquely for a given set of filter parameters as follows: $p_{00}$, $p_{01}$, $p_{10}$, $p_{11}$. The advantage to a hardware implementation of this post-filter is the fact that the only varying part is restricted to four elements, the rest of the element are constants.

Figure 17:
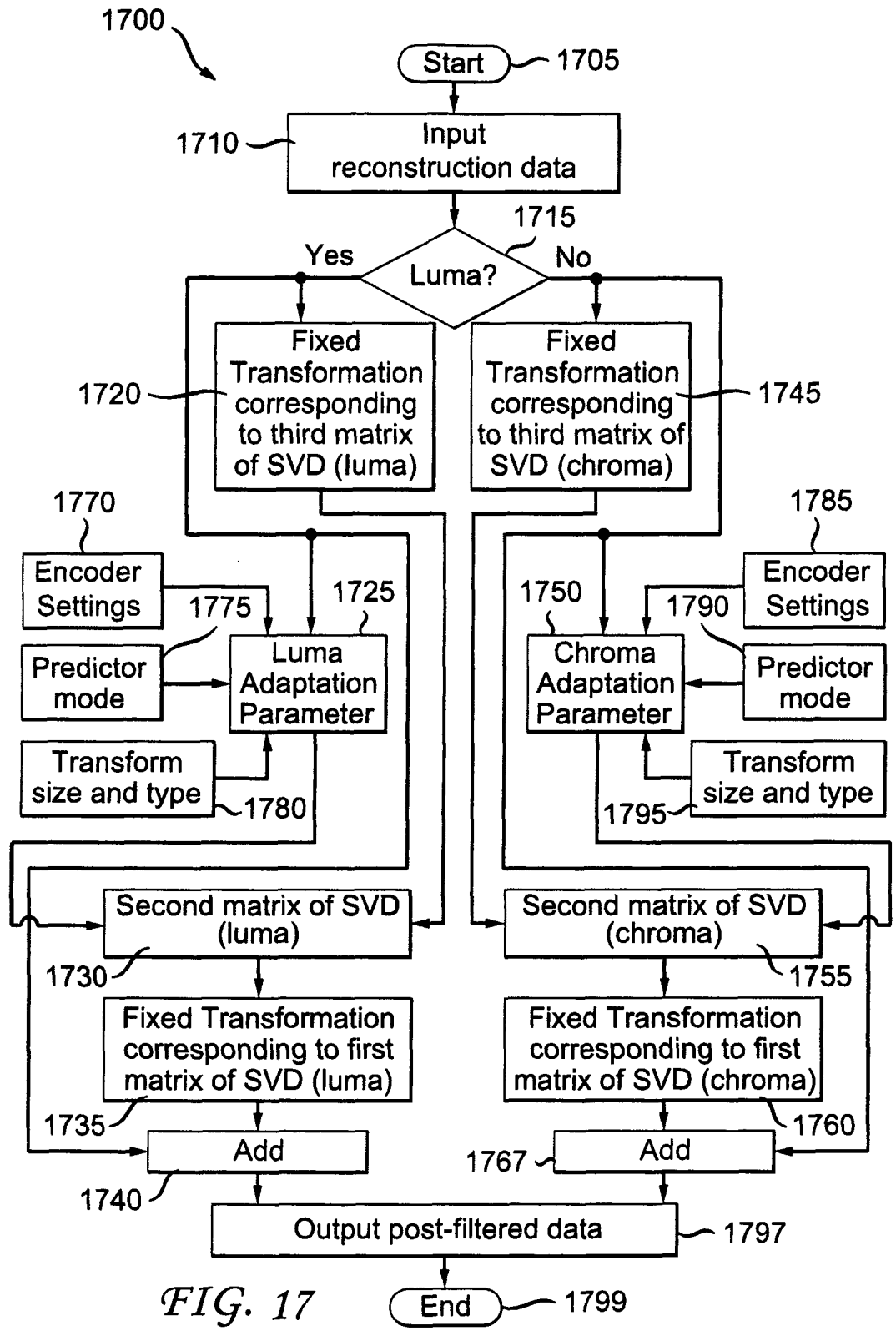
FIG. 17 is a flow diagram showing an exemplary method for efficiently implementing a post-filter in hardware, in accordance with an embodiment of the present principles.

Turning to FIG. 17, an exemplary method for efficiently implementing a post-filter in hardware is indicated generally by the reference numeral 1700. The method 1700 includes a start block 1705 that passes control to a function block 1710. The function block 1710 inputs reconstruction data, and passes control to a decision block 1715. The decision block 1715 determines whether or not the current component to be filtered is the luma component. If so, then control is passed to a function block 1720, a function block 1725, and a function block 1740. Otherwise, control is passed to a function block 1745, a function block 1750, and a function block 1767. The function block 1720 obtains a fixed transformation corresponding to the third matrix of SVD (luma), and passes control to a function block 1730. The function block 1745 obtains a fixed transformation corresponding to the third matrix of SVD (chroma), and passes control to a function block 1755. The function block 1730 obtains a second matrix of SVD (luma), and passes control to a function block 1735. The function block 1735 obtains a fixed transformation corresponding to the first matrix of SVD (luma), and passes control to a function block 1740. The function block 1740 performs an add operation that adds the reconstructed luma data to the transformed data of block 1735, and passes control to a function block 1797. The function block 1755 obtains a second matrix of SVD (chroma), and passes control to a function block 1760. The function block 1760 obtains a fixed transformation corresponding to the first matrix of SVD (chroma), and passes control to a function block 1767. The function block 1767 performs an add operation that adds the reconstructed chroma data to the transformed data of block 1760, and passes control to a function block 1797. The function block 1797 outputs post-filtered data, and passes control to an end block 1799. The function block 1725 sets the luma adaptation parameter, and passes control to the function block 1730. The function block 1750 sets the chroma adaptation parameter, and passes control to the function block 1755. Regarding function block 1725, the same sets the luma adaptation parameter based on encoder settings 1770, a predictor mode, 1775, and a transform size and type 1780. Regarding function block 1750, the same sets the chroma adaptation parameter based on encoder settings 1785, a predictor mode 1790, and a transform size and type 1795.

A software approach to speeding up filter implementations is to approximate the adaptive filters using integer implementations. In an embodiment, under integer implementation, all the floating point operations carried out during pre-filtering and post-filtering are converted to integer multiplications and bit shifts. The bit shifts will restrict integer divisions to division by a power of 2. The adaptive pre-filter of Equation (7) can be implemented by converting the filter parameter matrix into integer multiplication followed finally by bit shifts. Next the scaling parameter s can be multiplied to the obtained data prior to adding the obtained data with the original data. For the adaptive post-filter equation, we determine an integer implementation which is close to the inverse of the integer pre-filter and at the same time close to the original floating point $P(s)^{-1}$.

Figure 18:
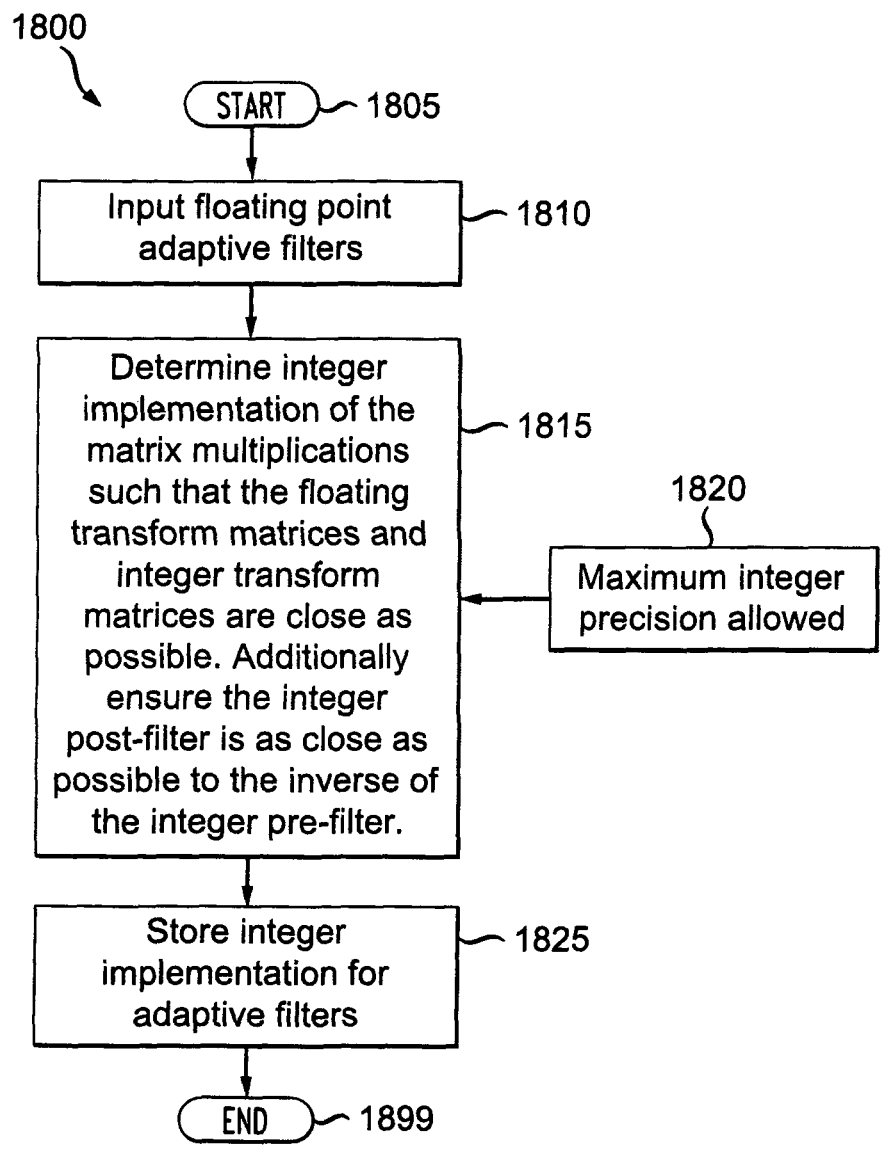
FIG. 18 is a flow diagram showing an exemplary method for determining integer implementations of original floating point adaptive filters, in accordance with an embodiment of the present principles.

Turning to FIG. 18, an exemplary method for determining integer implementations of original floating point adaptive filters is indicated generally by the reference numeral 1800. The method 1800 includes a start block 1805 that passes control to a function block 1810. The function block 1810 inputs floating point adaptive filters, and passes control to a function block 1815. The function block 1815 determines an integer implementation of the matrix multiplications such that the floating transform matrices and integer transform matrices are close as possible, additionally ensure that the integer post-filter is as close as possible to the inverse of the integer pre-filter, and passes control to a function block 1825. The function block 1825 stores the integer implementation for the adaptive filters, and passes control to an end block 1899. The function block 1820 sets the maximum integer precision allowed, and passes control to the function block 1815.

Various Innovations and Points of Novelty

Pre-filter the original data and coupled post-filter in the coding loop (and decoder side)

"Coupled filters":

Post-filter is exact (perfect) inverse of the pre-filter

Adaptive post-filter is "substantially inverse" from the adaptive pre-filter
"substantially inverse": adaptation parameter is chosen so that small perturbations do not impact adaptation significantly
In the case of no quantization and with adaptation, the exact inverse is not attained because adaptation is based on the original data which is not available at the decoder
The post-filter is not the exact inverse: minimize the difference between the observation and the original data filtered
the direction of 2-D filters depends on the local direction of the gradient
Use different filters for the luma component and the chroma component
Use 1-D filters
Use different filters for the vertical and horizontal directions
Predictive prediction efficiency in the design of the coupled filters
Adaptation of coupled filters to local data (edges, gradient, and/or variance)
Continuous adaptation of the filters
Use of a discrete set of coupled filters each of which is applied to a subset of the local statistics
3 pre-filters and 3 post-filters depending on the local gradient
Most probable mode predictor adapted to the filtering mechanism
rate-distortion (RD) modified for the filtering mechanism (encoder only optimization)
The filters can be adaptively applied as follows: at transform boundary unit only; at the transform boundary and within the transform unit; and not applied to the transform unit at all. The transform unit can be, for example, a block or a macroblock.
The method to enable comparison and selection between the above 3 modes is follows: create the 3 units and perform an RD-cost comparison to determine the best coding option for the current unit. It is to be appreciated that the decision made for the current unit will impact units which are to be coded in the future.
Lifting scheme implementation of the coupled filters
Gaussian elimination and Givens rotation implementations
The adaptive pre-filter and post-filter combination works with different transforms (DCT, KLT, MDDT) and different transform dimensions.

A description will now be given of some of the many attendant advantages/features of the present invention, some of which have been mentioned above. For example, one advantage/feature is an apparatus having a video encoder for encoding input data for a picture into a resultant bitstream. The video encoder includes a pre-filter and a post-filter coupled to the pre-filter. The pre-filter filters the input data for the picture and the post-filter filters in-loop reconstructed data for the picture.

Another advantage/feature is the apparatus having the video encoder as described above, wherein filter coefficients and filter parameters of the post-filter are selected such that the post-filter is an exact inverse of the pre-filter.

Yet another advantage/feature is the apparatus having the video encoder as described above, wherein at least one of the pre-filter and the post-filter include different filters, and chroma components of the picture are filtered using different ones of the different filters than the luma components of the picture.

Still another advantage/feature is the apparatus having the video encoder as described above, wherein at least one of filter coefficients and filter parameters for at least one of the pre-filter and the post-filter are selected responsive to at least one of a resolution, a quantization level, a local gradient, a prediction mode, and a gradient direction.

Still yet another advantage/feature is the apparatus having the video encoder as described above, wherein a post-filter transform matrix used by the post-filter to filter the reconstructed data is decomposed into two summands, one of the two summands being an identity matrix and another one of the two summands being a matrix representing a multiplication of a first, a second, and a third matrix, the first and the third matrices being fixed, and the second matrix being variable in order to reverse an adaptation of the pre-filter.

Moreover, another advantage/feature is the apparatus having the video encoder as described above, wherein filter coefficients and filter parameters of the post-filter are selected such that the post-filter is substantially an inverse of the pre-filter.

Further, another advantage/feature is the apparatus having the video encoder wherein filter coefficients and filter parameters of the post-filter are selected such that the post-filter is substantially an inverse of the pre-filter as described above, wherein the post-filter is configured to substantially provide a same output data there from as input data provided to the pre-filter by minimizing a difference between an observation and a pre-filtered estimate, the observation relating to input data provided to the post-filter, and the pre-filtered estimate relating to an estimate of the input data for the picture prior to filtering by the pre-filter.

Also, another advantage/feature is the apparatus having the video encoder as described above, wherein the pre-filter and the post-filter are integer implementations determined so as to minimize a distance relating to an exact invertibility between the pre-filter and the post-filter.

Additionally, another advantage/feature is the apparatus having the video encoder as described above, wherein a filter size of the pre-filter and the post-filter is a same size as a transform applied to residue data, the residue data representing a difference between the input data for the picture and reference data for at least one reference picture.

Moreover, another advantage/feature is the apparatus having the video encoder wherein a filter size of the pre-filter and the post-filter is a same size as a transform applied to residue data, the residue data representing a difference between the input data for the picture and reference data for at least one reference picture as described above, wherein the pre-filter and the post-filer include multiple filters, and at least one of the multiple filters is applied to all transform sizes of transforms applied to the residue data.

Further, another advantage/feature is the apparatus having the video encoder as described above, wherein a filter size of at least one of the pre-filter and the post-filter is different from a size of a transform applied to the input data.

Also, another advantage/feature is the apparatus having the video encoder as described above, wherein the pre-filter and the post-filter are applied to only a portion of the input data.

Additionally, another advantage/feature is the apparatus having the video encoder wherein the pre-filter and the post-filter are applied to only a portion of the input data as described above, wherein the portion of the input data is selected from at least one of a block boundary, and within a block.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
   a video encoder for encoding input data for a picture into a resultant bitstream, wherein said video encoder comprises a pre-filter and a post-filter coupled to the pre-filter, wherein said pre-filter filters the input data for the picture and the post-filter filters in-loop reconstructed data for the picture,
   wherein at least one of filter coefficients and filter parameters for at least one of the pre-filter and the post-filter are selected responsive to at least one of a resolution, a local gradient, and a gradient direction, wherein gradient is a difference between pixels being pre-filtered, and adaptation is made discrete by partitioning a gradient strength, gradient direction and gradient variance into disjoint ranges and applying fixed filters for different ranges, and
   wherein a Lagrangian parameter for luminance and chrominance in the video encoder's rate-distortion optimizer is a function of the coding efficiency of the pre-filter and the post-filter; and
   wherein the pre-filter and post-filter are implemented with a lifting scheme and adaptation is embedded therein by changing values of a diagonal matrix, obtained by performing singular value decomposition on a fixed pre-filter transform matrix, such that values of the diagonal matrix can be reversed at a decoder.

2. In a video encoder, a method, comprising:
   encoding input data for a picture into a resultant bitstream, wherein said video encoder comprises a pre-filter and a post-filter coupled to the pre-filter, wherein said pre-filter filters the input data for the picture and the post-filter filters in-loop reconstructed data for the picture,
   wherein at least one of filter coefficients and filter parameters for at least one of the pre-filter and the post-filter are selected responsive to at least one of a resolution, a local gradient, and a gradient direction, wherein gradient is a difference between pixels being pre-filtered, and adaptation is made discrete by partitioning a gradient strength, gradient direction and gradient variance into disjoint ranges and applying fixed filters for different ranges, and
   wherein a Lagrangian parameter for luminance and chrominance in the video encoder's rate-distortion optimizer is a function of the coding efficiency of the pre-filter and the post-filter; and
   wherein the pre-filter and post-filter are implemented with a lifting scheme and adaptation is embedded therein by changing values of a diagonal matrix, obtained by performing singular value decomposition on a fixed pre-filter transform matrix, such that values of the diagonal matrix can be reversed at a decoder.

3. The method of claim 2, wherein filter coefficients and filter parameters of the post-filter are selected such that the post-filter is an exact inverse of the pre-filter.

4. The method of claim 2, wherein at least one of the pre-filter and the post-filter comprise different filters, and chroma components of the picture are filtered using different ones of the different filters than the luma components of the picture.

5. The method of claim 2, wherein a post-filter transform matrix used by the post-filter to filter the reconstructed data is decomposed into two summands, one of the two summands being an identity matrix and another one of the two summands being a matrix representing a multiplication of a first, a second, and a third matrix, the first and the third matrices being fixed, and the second matrix being variable in order to reverse an adaptation of the pre-filter.

6. The method of claim 2, wherein filter coefficients and filter parameters of the post-filter are selected such that the post-filter is an inverse of the pre-filter.

7. The method of claim 6, wherein the post-filter is configured to provide a same output data there from as input data provided to the pre-filter by minimizing a difference between an observation and a pre-filtered estimate, the observation relating to input data provided to the post-filter, and the pre-filtered estimate relating to an estimate of the input data for the picture prior to filtering by the pre-filter.

8. The method of claim 2, wherein the pre-filter and the post-filter are integer implementations determined so as to minimize a distance relating to an exact invertibility between the pre-filter and the post-filter.

9. The method of claim 2, wherein a filter size of the pre-filter and the post-filter is a same size as a transform applied to residue data, the residue data representing a difference between the input data for the picture and reference data for at least one reference picture.

10. The method of claim 9, wherein the pre-filter and the post-filer comprise multiple filters, and at least one of the multiple filters is applied to all transform sizes of transforms applied to the residue data.

11. The method of claim 2, wherein a filter size of at least one of the pre-filter and the post-filter is different from a size of a transform applied to the input data.

12. The method of claim 2, wherein the pre-filter and the post-filter are applied to only a portion of the input data.

13. The method of claim 12, wherein the portion of the input data is selected from at least one of a block boundary, and within a block.

14. An apparatus, comprising:
a video decoder for decoding residual image data for a picture, wherein said video decoder comprises a pre-filter and a post-filter coupled to the pre-filter, wherein said pre-filter filters a reference picture for use in decoding the residual image data and the post-filter filters in-loop reconstructed data for the picture,
wherein at least one of filter coefficients and filter parameters for at least one of the pre-filter and the post-filter are selected responsive to at least one of a resolution, a local gradient, and a gradient direction, wherein gradient is a difference between pixels being pre-filtered, and adaptation is made discrete by partitioning a gradient strength, gradient direction and gradient variance into disjoint ranges and applying fixed filters for different ranges, and
wherein a Lagrangian parameter for luminance and chrominance in the video decoder's rate-distortion optimizer is a function of the coding efficiency of the pre-filter and the post-filter; and
wherein the pre-filter and post-filter are implemented with a lifting scheme and adaptation is embedded therein by changing values of a diagonal matrix, obtained by performing singular value decomposition on a fixed pre-filter transform matrix, such that values of the diagonal matrix can be reversed from those of an encoder.

15. In a video decoder, a method comprising:
decoding residual image data for a picture, wherein said video decoder comprises a pre-filter and a post-filter coupled to the pre-filter, wherein said pre-filter filters a reference picture for use in decoding the residual image data and the post-filter filters in-loop reconstructed data for the picture,
wherein at least one of filter coefficients and filter parameters for at least one of the pre-filter and the post-filter are selected responsive to at least one of a resolution, a local gradient, and a gradient direction, wherein gradient is a difference between pixels being pre-filtered, and adaptation is made discrete by partitioning a gradient strength, gradient direction and gradient variance into disjoint ranges and applying fixed filters for different ranges, and
wherein a Lagrangian parameter for luminance and chrominance in the video decoder's rate-distortion optimizer is a function of the coding efficiency of the pre-filter and the post-filter; and
wherein the pre-filter and post-filter are implemented with a lifting scheme and adaptation is embedded therein by changing values of a diagonal matrix, obtained by performing singular value decomposition on a fixed pre-filter transform matrix, such that values of the diagonal matrix can be reversed from those of an encoder.

16. The method of claim 15, wherein filter coefficients and filter parameters of the post-filter are selected such that the post-filter is an exact inverse of the pre-filter.

17. The method of claim 15, wherein at least one of the pre-filter and the post-filter comprise different filters, and chroma components of the picture are filtered using different ones of the different filters than the luma components of the picture.

18. The method of claim 15, wherein at least one of filter coefficients and filter parameters for at least one of the pre-filter and the post-filter are selected responsive to at least one of a resolution, a quantization level, a local gradient, a prediction mode, and a gradient direction.

19. The method of claim 15, wherein a post-filter transform matrix used by the post-filter to filter the reconstructed data is decomposed into two summands, one of the two summands being an identity matrix and another one of the two summands being a matrix representing a multiplication of a first, a second, and a third matrix, the first and the third matrices being fixed, and the second matrix being variable in order to reverse an adaptation of the pre-filter.

20. The method of claim 15, wherein filter coefficients and filter parameters of the post-filter are selected such that the post-filter is an inverse of the pre-filter.

21. The method of claim 20, wherein the post-filter is configured to provide a same output data there from as input data provided to the pre-filter by minimizing a difference between an observation and a pre-filtered estimate, the observation relating to input data provided to the post-filter, and the pre-filtered estimate relating to an estimate of the input data for the picture prior to filtering by the pre-filter.

22. The method of claim 15, wherein the pre-filter and the post-filter are integer implementations determined so as to minimize a distance relating to an exact invertibility between the pre-filter and the post-filter.

23. The method of claim 15, wherein a filter size of the pre-filter and the post-filter is a same size as a transform applied to residue data, the residue data representing a difference between the input data for the picture and reference data for at least one reference picture.

24. The method of claim 23, wherein the pre-filter and the post-filer comprise multiple filters, and at least one of the multiple filters is applied to all transform sizes of transforms applied to the residue data.

25. The method of claim 15, wherein a filter size of at least one of the pre-filter and the post-filter is different from a size of a transform applied to the input data.

26. The method of claim 15, wherein the pre-filter and the post-filter are applied to only a portion of the input data.

27. The method of claim 26, wherein the portion of the input data is selected from at least one of a block boundary, and within a block.

28. A non-transitory computer readable storage media having video signal data encoded thereupon, comprising:
input data for a picture encoded, wherein the input data for the picture, when encoded, was pre-filtered using a pre-filter, and in-loop reconstructed data for the picture, when encoded, was post-filtered using a post-filter directly coupled to the pre-filter,
wherein at least one of filter coefficients and filter parameters for at least one of the pre-filter and the post-filter are selected responsive to at least one of a resolution, a local gradient, and a gradient direction, wherein gradient is a difference between pixels being pre-filtered, and adaptation is made discrete by partitioning a gradient strength, gradient direction and gradient variance into disjoint ranges and applying fixed filters for different ranges, and wherein a Lagrangian parameter for luminance and chrominance in the encoded video's rate-distortion optimizer is a function of the coding efficiency of the pre-filter and the post-filter; and wherein the pre-filter and post-filter are implemented with a lifting scheme and adaptation is embedded therein by changing values of a diagonal matrix, obtained by performing singular value decomposition on a fixed pre-filter transform matrix, such that values of the diagonal matrix can be reversed from those of an encoder.

* * * * *